(12) United States Patent
Mo et al.

(10) Patent No.: US 12,554,374 B2
(45) Date of Patent: Feb. 17, 2026

(54) RESOLVING ISSUES BY BUILDING A RE-PLAYABLE SIMULATED CUSTOMER ENVIRONMENT

(71) Applicant: INTERNATIONAL BUSINESS MACHINES CORPORATION, Armonk, NY (US)

(72) Inventors: Ying Mo, Beijing (CN); Rui Liu, Beijing (CN); Yue Chen, Beijing (CN); Ya Xiao, Beijing (CN); Hu Wang, Beijing (CN); Peng Hui Jiang, Beijing (CN); Qi Feng Huo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 18/402,064

(22) Filed: Jan. 2, 2024

(65) Prior Publication Data
US 2025/0217001 A1    Jul. 3, 2025

(51) Int. Cl.
*G06F 3/04815* (2022.01)
*G06F 3/0484* (2022.01)
*G06F 11/34* (2006.01)

(52) U.S. Cl.
CPC ........ *G06F 3/04815* (2013.01); *G06F 3/0484* (2013.01); *G06F 11/3414* (2013.01)

(58) Field of Classification Search
CPC .... G06F 3/04815; G06F 3/0484; G06F 11/34; G06F 11/3414; G06F 11/3457
See application file for complete search history.

(56) References Cited

U.S. PATENT DOCUMENTS

| 10,083,224 B2 | 9/2018 | Jiang et al. |
| 10,785,122 B2 | 9/2020 | Inamdar et al. |
| 11,144,441 B1 * | 10/2021 | Colwell .............. G06F 11/3692 |

(Continued)

FOREIGN PATENT DOCUMENTS

| CN | 112560244 B | 12/2021 |
| KR | 20200027783 A | 3/2020 |

OTHER PUBLICATIONS

"ContainIQ Overview", 2pp., [online][retrieved Nov. 16, 2023] https://docs.containiq.com.

(Continued)

*Primary Examiner* — Daniel Samwel
(74) *Attorney, Agent, or Firm* — Konrad, Raynes, Davda & Victor, LLP; Janaki K. Davda

(57) ABSTRACT

Provided are techniques for resolving issues by building a re-playable simulated customer environment. Environment data of an original customer environment is stored in a data hub. The environment data from the data hub us used to create a simulated customer environment. The simulated customer environment is played. In response to the playing, one or more issues in the original customer environment are identified using the simulated customer environment and one or more solutions for the one or more issues are identified. A recommendation is provided with a solution of the one or more solutions for solving at least one of the issues in the original customer environment. Application of the recommendation to the original customer environment to resolve the at least one of the issues is automatically initiated.

20 Claims, 30 Drawing Sheets

(56) References Cited

U.S. PATENT DOCUMENTS

| | | | |
|---|---|---|---|
| 11,295,047 B2 | 4/2022 | Asenjo et al. | |
| 11,775,204 B1 | 10/2023 | Hasti et al. | |
| 12,346,708 B1* | 7/2025 | Agarwal | G06F 11/3419 |
| 2016/0246708 A1* | 8/2016 | Sabag | G06F 11/3698 |
| 2018/0006902 A1* | 1/2018 | Bansal | G06F 11/3457 |
| 2019/0102280 A1 | 4/2019 | Caldato et al. | |
| 2022/0318323 A1* | 10/2022 | Coursaux | G06F 16/954 |
| 2023/0104368 A1 | 4/2023 | Miriyala et al. | |
| 2023/0171321 A1* | 6/2023 | Lackner | H04L 67/535 709/203 |
| 2023/0199083 A1* | 6/2023 | Goh | H04L 67/535 709/224 |
| 2024/0256429 A1* | 8/2024 | Lucioni | G06F 11/3072 |

OTHER PUBLICATIONS

"Gathering Data about your Cluster", RedHat, 32pp., [online][retrieved Nov. 9, 2023] https://docs.openshift.com/container-platform/4.11/support/gathering-cluster-data.html#about-must-gather_gathering-cluster-data.

"Overview Prometheus", 4pp., [online][retrieved Nov. 10, 2023] https://prometheus.io/docs/introduction/overv.

"Sidecar", Thanos, 5pp., [olnine][retrieved Nov. 10, 2023] https://thanos.io/tip/components/sidecar.md/.

"What is AIOps?", IBM Corporation, 10 pp. [online][retrieved Nov. 9, 2023] https://www.ibm.com/topics/aiops.

"What is application performance managment (AMP)?" IBM Corporation, 8 pp. [online][retrieved Nov. 9, 2023] https://ibm.com/topics/application-performance-management.

What is etcd? IBM Corporation, 10pp., [online][retrieved Nov. 10, 2023] https://ibm.com/topics/etcd.

M. Chawre, "Sloop: a Tool to Visualize the History of Kubernetes Resources", Milind's Blog, Nov. 3, 2020, 7 pp., [online][retrieved Nov. 16, 2023] https://milindchawre.github.io/site/blog/sloop-a-tool-to-visualize-the-his . . . .

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

\* cited by examiner

Configuration Map (ConfigMap: cluster-data-collecting-config) — 510

```yaml
# Configuration for the data collecting module
apiVersion: v1
kind: ConfigMap
metadata:
  name: cluster-data-collecting-config
  namespace: cluster-data-collecting
data:
  config.yaml: |
    # The timeRange indicates the time range of data collecting
    timeRange:
      # Indicates when to start, default to when the data collecting module is launched.
      # It supports cron expression.
      startTime: "2022-10-25 01:41:00"
      # Indicates when to stop, default to never ended.
      # endTime: null
      # Indicates how long it lasts
      # duration: 1h
    # The resources indicates which types of resources will be scanned
    resources: ["workload", "deployments", "services", "configmaps", "secrets"]
    # The features allow customizing specific data collecting feature
    features:
      collectingLogs:
        enabled: true
      collectingEvents:
        enabled: true
      collectingMetrics:
        enabled: true
        endpoints:
          - "https://container-orchestration-platform.default.svc/metrics"
```

Audit Policy — 520

```
apiVersion: audit.io/v1 # This is required.
kind: Policy

# Prevent requests in the ResponseStarted stage from generating audit events.
omitStages: ["ResponseStarted"]

rules:
# do not log requests to the following
  - level: None
    nonResourceURLs: ["/healthz*", "/logs", "/metrics", "/version"]
  # Log specified resource changes at RequestResponse level in placeholder namespace.
  - level: RequestResponse
    resources:
    - group: "" # core API group
      resources: ["workload", "deployments", "services", "configmaps", "secrets"]
      verbs: ["create", "patch", "update", "delete"]
      # Use an empty string [""] to select resources not associated with a namespace.
    namespaces: ["placeholder"]
  # Log "workload/log", "workload/status" at RequestResponse level in placeholder namespace.
  - level: RequestResponse
    resources:
    - group: ""
      resources: ["workload/log", "workload/status"]
      namespaces: ["placeholder"]
  # Don't log watch requests by the "system:proxy" on endpoints or services
  - level: None
    users: ["system:proxy"]
    verbs: ["watch"]
    resources:
    - group: "" # core API group
      resources: ["endpoints", "services"]
```

Audit Event — 530

```
{
  "kind": "Event",
  "apiVersion": "audit.io/v1",
  "level": "RequestResponse",
  "auditID": "a6029022-4ff0-4c54-97ed-4099d0ca1923",
  "stage": "ResponseComplete",
  "requestURI":
"/api/v1/namespaces/default/serviceaccounts?fieldManager=
container orchestration client-create",
  "verb": "create",
  "user": {
    "username": "container-orchestration-platform-admin",
    "groups": ["system:masters", "system:authenticated"]
  },
  "sourceIPs": ["172.31.22.88"],
  "userAgent": "container orchestration client/v1.23.6
container-orchestration-platform/ad33385",
  "objectRef": {
    "resource": "serviceaccounts",
    "namespace": "default",
    "name": "test",
    "apiVersion": "v1"
  },
  "responseStatus": {
    "metadata": {},
    "code": 201
  },
  "requestObject": {
    "kind": "ServiceAccount",
    "apiVersion": "v1",
    "metadata": {
      "name": "test",
      "creationTimestamp": null
    }
  },
  "responseObject": {
    "kind": "ServiceAccount",
    "apiVersion": "v1",
    "metadata": {
      "name": "test",
      "namespace": "default",
      "uid": "d6ea858a-206d-4b4a-aca0-499e22f00729",
      "resourceVersion": "1676",
      "creationTimestamp": "2022-07-31T08:36:48Z"
    }
  },
  "requestReceivedTimestamp": "2022-07-31T08:36:48.679291Z",
  "stageTimestamp": "2022-07-31T08:36:48.684377Z",
  "annotations": {
    "authorization.io/decision": "allow",
    "authorization.io/reason": ""
  }
}
```

B →

| Recorded resource environment data in data hub 540 | |
|---|---|
| RESOURCE_KEY | RESOURCE_DATA |
| /registry/workload/placeholder/my-app-76457756fb-52z74 | <resource environment data> |
| /registry/configmaps/placeholder/my-sample-config | <resource environment data> |
| /registry/services/endpoints/placeholder/my-app-svc<resource environment data> | <resource environment data> |
| /registry/services/specs/placeholder/my-app-svc | <resource environment data> |
| /registry/secrets/placeholder/my-sample-secret<resource environment data> | <resource environment data> |
| ... | ... |

FIG. 5D

| | | | | | | | | | | | | |
|---|---|---|---|---|---|---|---|---|---|---|---|---|
| Context: | default/api-bj-prod-19-luban-cdl-company a-com:... | | | | | | | | | | | |
| Cluster: | api-bj-prod-19-luban-cdl-company a-com:6443 | | | | | | | | | | | |
| User: | moyingbj@cn.company a.com/api-bj-prod-19-luban-c | | | | | | | | | | | |
| Rev-A: | v0.24.7 ⚡ v0.26.7 | | | | | | | | | | | |
| Rev-B: | v1.23.5+012e945 | | | | | | | | | | | |
| CPU: | 8% | | | | | | | | | | | |
| MEM: | 20% | | | | | | | | | | | |

| | | | |
|---|---|---|---|
| <0> | all | <a> | Attach |
| <1> | openshift-apiserver | <ctrl-d> | Delete |
| <2> | company b-operator | <d> | Describe |
| <3> | default | <e> | Edit |
| <4> | company b-core | <?> | Help |
| <5> | company b-units | <ctrl-k> | Kill |
| <6> | company b-elastic | | |
| <7> | company b-database | | |
| <8> | company b-sensor | | |

—————————————— Workload (default) [2] ——————————————

| NAME | PF | READY | RESTARTS | STATUS | CPU | MEM | %CPU/R | %CPU/L | %MEM/R | %MEM/L | IP | NODE |
|---|---|---|---|---|---|---|---|---|---|---|---|---|
| nfs-client-provisioner-2-deploy | ● | 0/1 | 0 | Completed | 0 | 0 | n/a | n/a | n/a | n/a | 10.129.2.11 | worker01 |
| nfs-client-provisioner-2-zbsn7 | ● | 1/1 | 3 | Running | 1 | 19 | n/a | n/a | n/a | n/a | 10.128.4.8 | worker19 |

<namespace>  <workload>

RESOLVING ISSUES BY BUILDING A RE-PLAYABLE SIMULATED CUSTOMER ENVIRONMENT

BACKGROUND

Embodiments of the invention relate to resolving issues by building a re-playable simulated customer environment of a container orchestration platform. In particular, embodiments of the invention relate to building an immutable, observable, and re-playable simulated customer environment of the container orchestration platform for solving issues in an original customer environment.

Developers may find that it is difficult to solve issues reported by customers from their customer environments because the developers are not able to interact directly with the customer's environment, which makes it difficult to communicate with customers on the issue. Developers often have to ask customers to collect various kinds of environment data (i.e., original customer environment data), prepare instructions for customers to troubleshoot by themselves, spend time setting up environments internally to mimic customer environments in an attempt to reproduce the issues, and/or set up a series of live calls with customers.

For example, in a case in which there is a multiple license count when updating a cluster with a cluster tool, the customer may see in the audit data that there are more managed resources than expected (e.g., 4 Managed Virtual Servers (MVS) are expected, but 20 MVS are shown) after several updates were applied. A component of the cluster tool component may call a License Service with metrics (e.g., MVS ( )) that indicate the number of systems (e.g., clusters, VMs, etc.) managed by the cluster tool. However, since the License Service doesn't track which component sent the metrics and due to a lack of logs before, during, and after the increase in the number of managed resources, developers are unable to determine which cluster tool component sent the metrics and whether the metric values are correct. In such a case, a live call with the customer not likely to help resolve the issue.

SUMMARY

In accordance with certain embodiments, a computer-implemented method comprising operations is provided for resolving issues by building a re-playable simulated customer environment. In such embodiments, environment data of an original customer environment is stored in a data hub. The environment data from the data hub us used to create a simulated customer environment. The simulated customer environment is played. In response to the playing, one or more issues in the original customer environment are identified using the simulated customer environment and one or more solutions for the one or more issues are identified. A recommendation is provided with a solution of the one or more solutions for solving at least one of the issues in the original customer environment. Application of the recommendation to the original customer environment to resolve the at least one of the issues is automatically initiated.

In accordance with other embodiments, a computer program product comprising a computer readable storage medium having program code embodied therewith is provided, where the program code is executable by at least one processor to perform operations for resolving issues by building a re-playable simulated customer environment. In such embodiments, environment data of an original customer environment is stored in a data hub. The environment data from the data hub us used to create a simulated customer environment. The simulated customer environment is played. In response to the playing, one or more issues in the original customer environment are identified using the simulated customer environment and one or more solutions for the one or more issues are identified. A recommendation is provided with a solution of the one or more solutions for solving at least one of the issues in the original customer environment. Application of the recommendation to the original customer environment to resolve the at least one of the issues is automatically initiated.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for resolving issues by building a re-playable simulated customer environment. In such embodiments, environment data of an original customer environment is stored in a data hub. The environment data from the data hub us used to create a simulated customer environment. The simulated customer environment is played. In response to the playing, one or more issues in the original customer environment are identified using the simulated customer environment and one or more solutions for the one or more issues are identified. A recommendation is provided with a solution of the one or more solutions for solving at least one of the issues in the original customer environment. Application of the recommendation to the original customer environment to resolve the at least one of the issues is automatically initiated.

BRIEF DESCRIPTION OF THE DRAWINGS

Referring now to the drawings in which like reference numbers represent corresponding parts throughout:

FIGS. 5A, 5B, 5C, and 5D illustrate examples of a configuration map, an audit policy, and an audit event in accordance with certain embodiments.

FIGS. 12A, 12B, 12C, 12D, and 12E illustrate user interfaces of container orchestration clients in accordance with certain embodiments.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
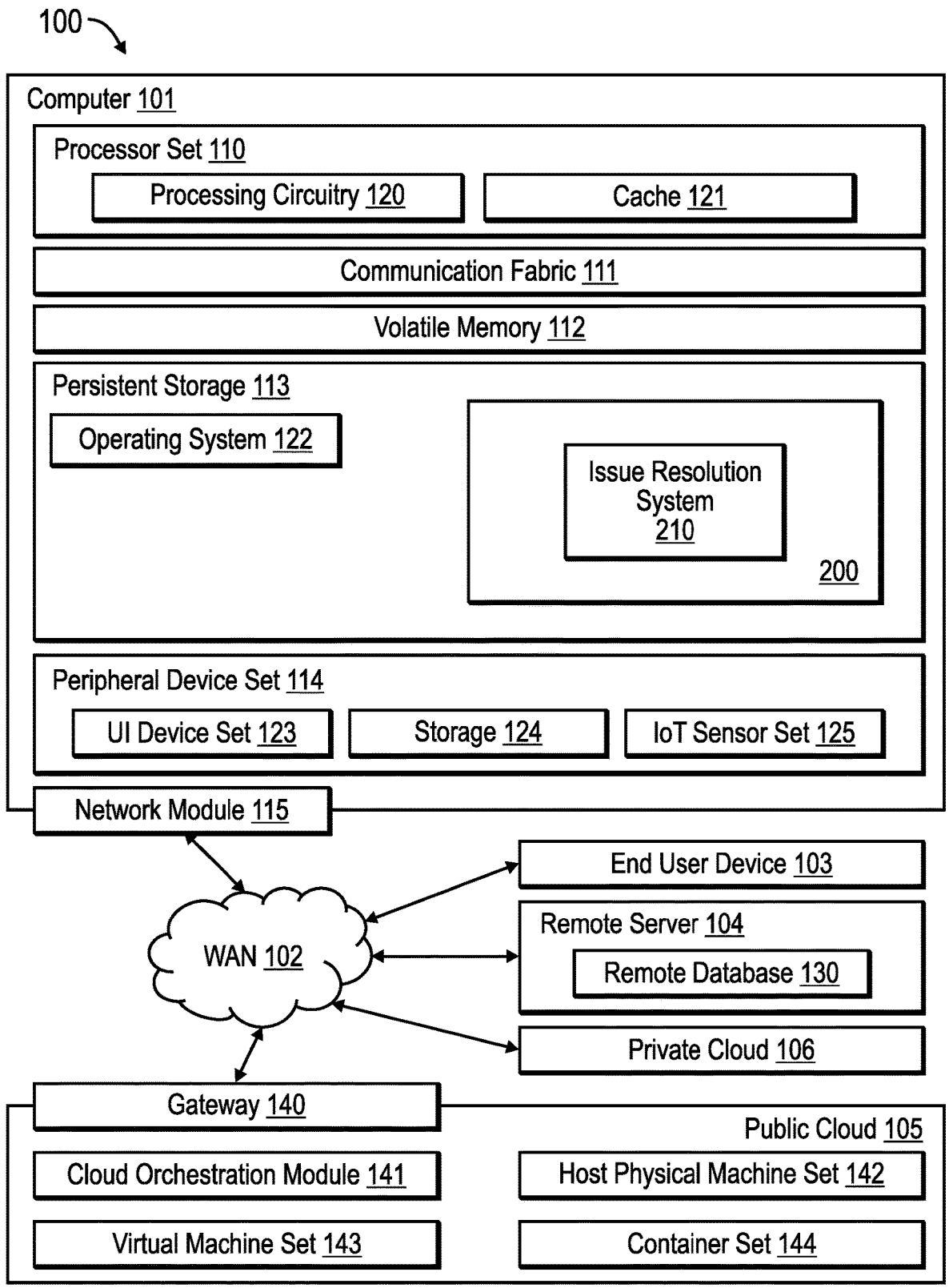
FIG. 1 illustrates a computing environment in accordance with certain embodiments.

Computing environment 100 of FIG. 1 contains an example of an environment for the execution of at least some of the computer code involved in performing the inventive methods, such as an issue resolution system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
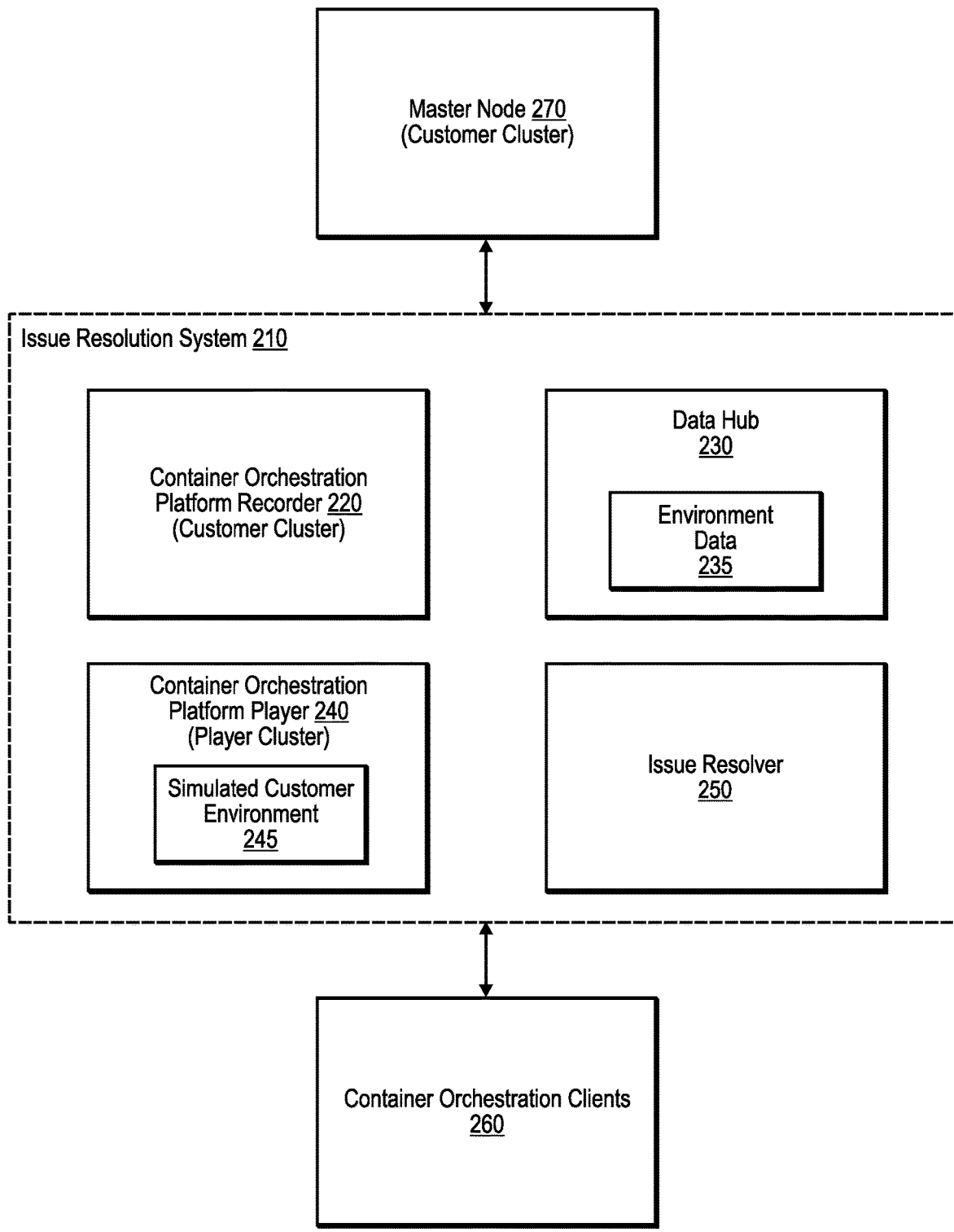
FIG. 2 illustrates, in a block diagram, a computing environment for an issue resolution system in accordance with certain embodiments.

FIG. 2 illustrates, in a block diagram, a computing environment for an issue resolution system 210 in accordance with certain embodiments. The issue resolution system 210 includes a container orchestration platform recorder 220 (for collecting and recording data about the original customer environment), a data hub 230 (for storing the environment data 235), a container orchestration platform player 240 (for creating and playing a simulated customer environment 245), and an issue resolver 250 (for identifying and solving an issue in the simulated customer environment and applying the solution to the original customer environment). In addition, container orchestration clients 260 may use (consume) the simulated customer environment 245.

In certain embodiments, the container orchestration platform recorder 220, the data hub 230, the container orchestration platform player 240, and the issue resolver 250 are components of the issue resolution system 210. In certain embodiments, the components 220, 230, 240, 250 are on separate nodes, such that each of the nodes may be implemented using computing environment 100 with that component 220, 230, 240, 250 of the issue resolution system 210. The issue resolution system 210 is connected to a master node 270, which is part of a customer cluster and stores data on the original customer environment at the customer site.

In certain embodiments, by having the container orchestration platform recorder 220 in the customer cluster and the container orchestration platform player 240 in a player cluster, embodiments enable issue resolution without having the developer directly accessing the customer environment for issue troubleshooting. The container orchestration platform recorder 220 is co-located with the master node 270 in order to collect the environment data of the original customer environment. With the container orchestration platform recorder 220 separated from the container orchestration platform player 240, the container orchestration platform recorder 220 uses the data hub 230 to transfer data to the container orchestration platform player 240. That is, the container orchestration platform recorder 220 stores the environment data in the data hub 230, and the container orchestration platform player 240 retrieves the environment data from the data hub 230.

In certain embodiments, the original customer environment refers to the real customer environment in which events occur and resources are managed, while the simulated customer environment refers to a simulation of that original customer environment. The container orchestration platform recorder 220 may be referred to as a "recorder" that records environment data from the original customer environment to enable creation of the simulated customer environment. The container orchestration platform player 240 may be referred to as a "player" that creates and plays the simulated customer environment.

In certain embodiments, the container orchestration platform recorder 220 records the original customer environment and transports the environment data to the data hub 230. The container orchestration platform player 240 uses the data in the data hub 230 to re-create the original customer environment by creating the simulated customer environment and plays the simulated customer environment.

In certain embodiments, the container orchestration platform player 240 is a lightweight container orchestration platform control plane with an Application Programming Interface (API) server that allows read access, provides a distributed key-value store that holds the environment data from the data hub 230, and plays (or replays) events selectively that happened in original customer environment. A control plane may be described as managing clusters and resources (e.g., workloads and worker nodes) to move the cluster resources from a current state to a desired state. In certain embodiments, the distributed key-value store may be a data store that is used to manage the configuration data, state data, and metadata for a container orchestration platform.

In a container orchestration platform, a workload (e.g., a pod) may be described as a collection of containers and data about the containers. The containers may be described as Virtual Machines (VMs) (each with a Central Processing Unit (CPU) share, a file system, a process space, a memory, etc.) that share an Operating System (OS) among applications. In such environments, when workloads are evicted, crashed, deleted, or scheduled to a different node, the environment data, such as in the workload logs (e.g., pod logs) for the containers are also destroyed. In particular, the environment data (including workload events) is maintained for one hour and then removed, along with contextual information about why the issues occurred. However, to resolve the issue, an issue resolution system 210 is able to provide the simulated customer environment to provide that contextual data and to resolve issues. The issue resolution system 210 enables going back to the past version of the original customer environment to enable observations of issues and data for resolving the issues. In certain embodiments, the simulated customer environment is immutable (i.e., cannot be changed).

In certain embodiments, the environment data about the original customer environment includes a cluster status of: metadata, status, events, workload logs, metrics, etc. of different resources. Unlike conventional systems that use timestamp data, the issue resolution system 210 collects the data by following the timeline from the original customer environment.

In certain embodiments, the container orchestration platform player 240 may be connected and consumed by various container orchestration clients (e.g., a command line tool for communicating with a control plane and enabling manual cluster status exploration). In certain embodiments, the container orchestration clients do not realize that the simulated customer environment that they connect to is not an original customer environment in a customer cluster.

In certain embodiments, the container orchestration platform player 240 may also be connected and consumed by observability solutions and products for advanced analysis (e.g., incident detecting, log analysis, etc.) without having direct access to the original customer environment.

The issue resolver 250 is able to identify an issue in the simulated customer environment (provided by the container orchestration platform player 240), generate one or more recommendations for resolving the issue, and automatically apply one or more of the recommendations in the original customer environment for resolving the issue.

For example, the issue resolver 250 may detect an incident by continuously monitoring events emitted by the container orchestration platform player 240 (e.g.: a workload has been crashing for more than 5 minutes and can not be recovered). In an example of log anomaly detecting, the issue resolver 250 detects that a workload has an unhealthy status by continuously checking the workload logs and finding an error in the workload logs.

The environment data may be for one or more resources and may be referred to as resource environment data.

Figure 3:
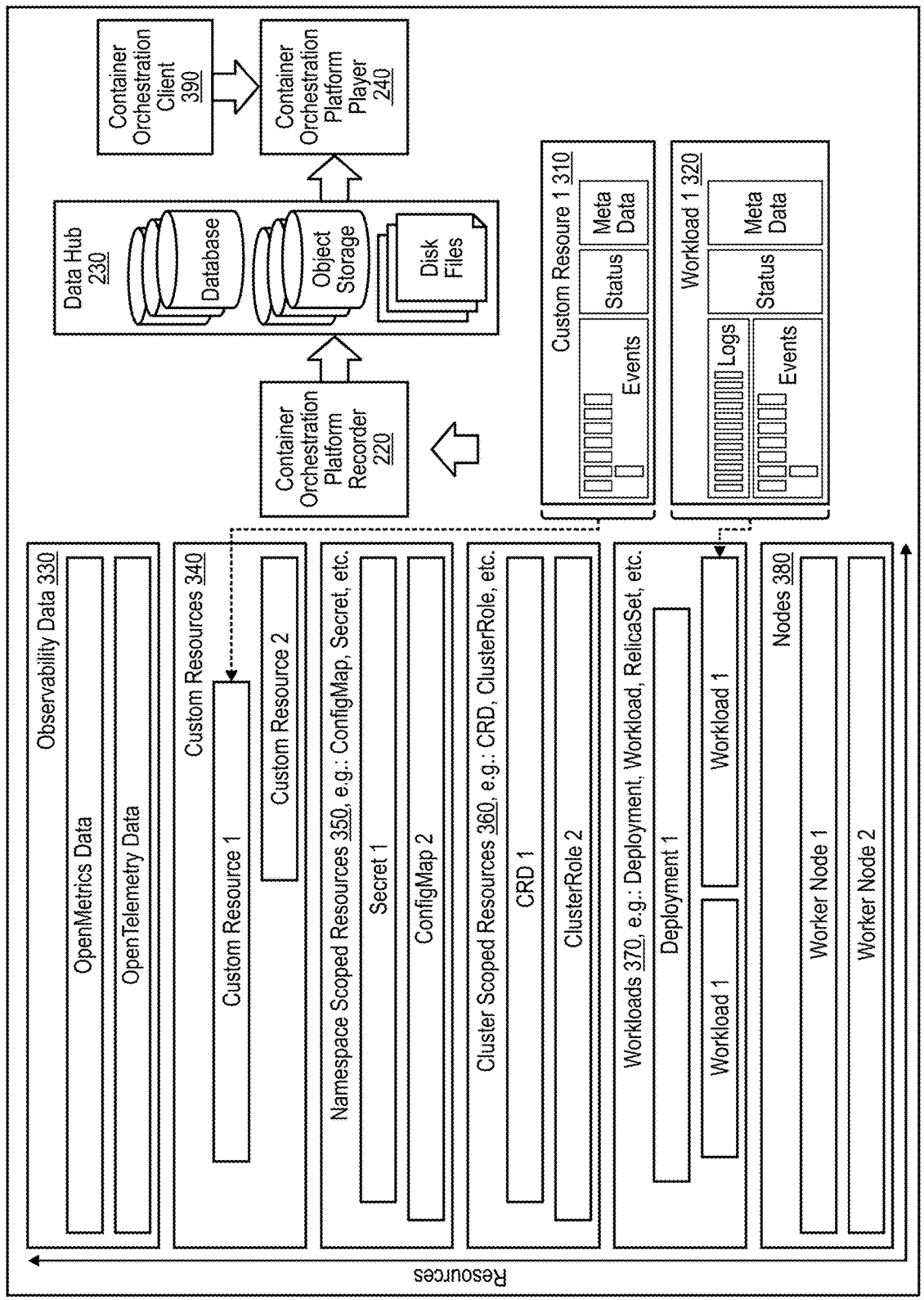
FIG. 3 illustrates further details of a container orchestration platform recorder, a data hub, and a container orchestration platform player in accordance with certain embodiments.

FIG. 3 illustrates further details of the container orchestration platform recorder 220, the data hub 230, and the container orchestration platform player 240 in accordance with certain embodiments. In the example of FIG. 3, the resources include: observability data 330, custom resources 340, namespace scoped resources 350, cluster scoped resources 390, workloads 370, and nodes 380. In addition, FIG. 3 illustrates custom resource 1 310 and workload 1 320. The custom resource 1 310 includes events, status, and metadata. The workload 1 320 represents data for multiple containers and includes logs, events, status, and metadata. The container orchestration platform recorder 220 obtains the custom resource 1 310 data and the workload 1 320 data and stores this data in the data hub 230. In the example of FIG. 3, the data hub 230 includes databases, object storage, and disk files. In other embodiments, the data hub 230 may include other data storage or a different combination of data storage. The container orchestration platform player 240 uses the data from the data hub 230 to create the simulated customer environment, which is a copy of the original customer environment. Also, the container orchestration client 390 may interact with the container orchestration platform player 240.

In certain embodiments, the issue resolution system 210 collects data from the original customer environment at many different levels (e.g.: infrastructure data, workload data (e.g., metadata, status, logs, and events), data from other resources (e.g., metadata, status, and events), and observability data (e.g., metrics). The data is saved into the data hub 230 and fed into the container orchestration platform player 240 (that plays the simulated customer environment), which may be consumed by a container orchestration client.

In certain embodiments, in response to user input (e.g., system administrator input), the container orchestration platform recorder 220 is configured with a scope for collected data before recording the data. For example, the configuration may specify one or more time ranges, one or more resource types, one or more namespaces, whether to include one or more logs or one or more events, other types of data to be collected, etc.

In certain embodiments, the container orchestration platform recorder 220 launches a resource data recording job (i.e., a data collection job) to run an initial scan of the resources based on scope started at a specified time (where T0 may be specified by a user). The resource data recording job queries and iterates over the resources for the environment data (e.g., metadata, status, workload logs, events, metrics, etc.) for a resource representation of the original customer environment one by one and stores the data to the data hub. In various embodiments, the data hub 230 may be local or remote to the original customer environment. Although it takes some time to scan the resources based on the specified scope, this does not impact status observation against the container orchestration platform player 240 when setting TO prior to a desired point in time.

The container orchestration platform recorder 220 listens to API calls passed through the API server in the original customer environment, filters out those API calls that are read-only or not in the scope (i.e., that won't impact the resources of interest). For API calls that are not filtered out, the container orchestration platform recorder 220 saves the timestamp when the call takes place as Ti and the result once the call is finished. In certain embodiments, the call represents any API invocation by a workload, a user, etc.

Figure 4A:
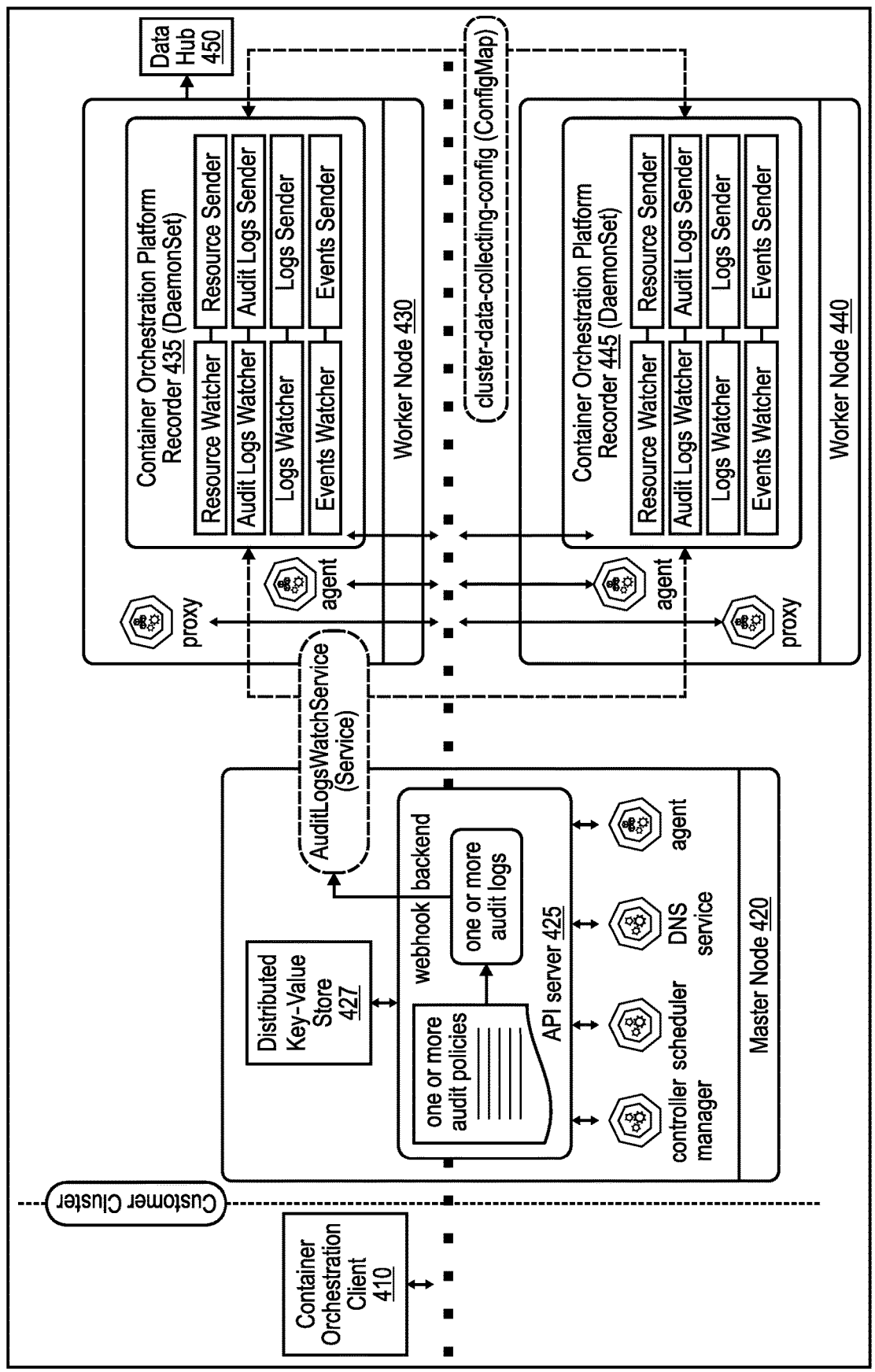
FIGS. 4A and 4B illustrate further details of the container orchestration platform recorder and the data hub in accordance with certain embodiments.
Figure 4B:
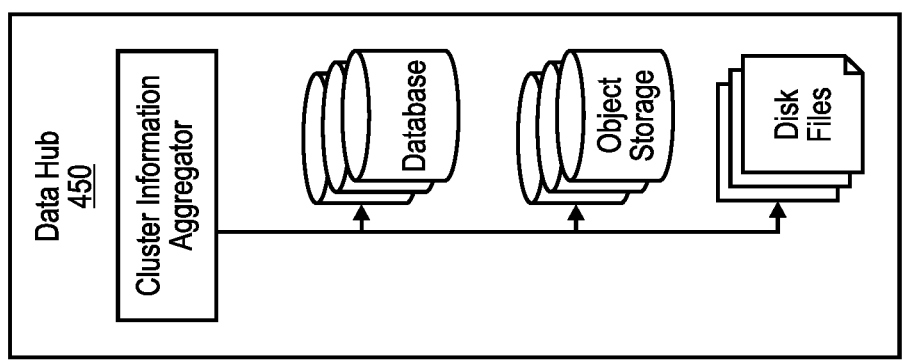

FIG. 4A illustrates further details of the container orchestration platform recorder 435, 445, while FIG. 4B illustrates further details of the data hub 450 in accordance with certain embodiments. A container orchestration client 410 is connected to a master node 420, which is connected to worker nodes 430, 440. The worker nodes 430, 440 are connected to the data hub 450.

In certain embodiments, the worker nodes 430, 440 are connected to the data hub 450 in an online mode. In certain other embodiments, the worker nodes 430, 440 may be disconnected from the data hub 450 (e.g., if the customer environment is air-gapped), and then the environment data collected from customer environment is packaged as transferrable data and is uploaded to the data hub 450 (e.g., at a later time).

The master node 420 includes a controller manager, a scheduler, a Domain Name System (DNS) service, an agent (for communicating with other agents), and an API server 425 connected to a distributed key-value store 427.

The worker node 430 includes a proxy (for communicating with an audit logs watch service), an agent (a "node-agent" for communicating with other agents), and a container orchestration platform recorder 435. The worker node 440 includes a proxy (for communicating with an audit logs watch service), an agent (a "node-agent" for communicating with other agents), and a container orchestration platform recorder 445. The container orchestration platform recorders 435, 445 are examples of the container orchestration platform recorder 220, while the data hub 450 is an example of the data hub 230.

The API server 425 of the master node 420 includes one or more audit policies and one or more audit logs. The audit policy is used to create and maintain the audit logs. An audit logs watch service looks for new data in the audit logs and notifies the container orchestration platform recorders 435, 445. Each of the container orchestration platform recorders 435, 445 includes a resource watcher (to watch for changes in resources), a resource sender (to send the changes in the resources to the data hub 450), an audit logs watcher (to watch for changes in the audit logs), an audit logs sender (to send changes in the audit logs to the data hub 450), a logs watcher (to watch for changes in the workload logs), a logs sender (to send changes in the workload logs to the data hub 450), an events watcher (to watch for changes in events), and an events sender (to send the changes in the events to the data hub 450). The data hub 450 includes a cluster information aggregator to aggregate the data that is received in one or more databases, one or more data storages, and one or more disk files. In certain embodiments, the data in the data hub 450 includes resource data, audit logs, events, other logs, and metrics.

In certain embodiments, the audit logs watch service ("AuditLogsWatchService") watches the one or more audit logs and reports changes to the audit logs watcher. The audit logs watch service is shared by the worker nodes 430, 440.

In certain embodiments, the API server 425 of the master node 420 maintains audit logs that record everything that happens within the customer cluster. For example, the audit logs record actions initiated by users, applications, and the master node 420 using API calls. In certain embodiments, the master node 420 is a control plane. In certain embodiments, the audit logs also detect security or compliance issues. The data in the audit logs are used to build the simulated customer environment that is played by the container orchestration platform player (i.e., the audit logs are used to re-build the original customer environment (e.g., the original customer cluster status)).

In certain embodiments, the resource watcher performs the initial scan, while the audit logs watcher exposes a service to collect the audit logs from the API server on the master node 420. In this way, the API server generates the audit logs, which are controlled by the audit policy. In addition, the scope of data being collected may be controlled by a configuration map (e.g., a ConfigMap called cluster-data-collecting-config). The data collected from the customer cluster is aggregated by the cluster information aggregator and saved into the database, object storage, or disk files. In certain embodiments, the ConfigMap is shared by the worker nodes 430, 440.

FIGS. 5A, 5B, 5C, and 5D illustrate examples of a configuration map 510, an audit policy 520, and an audit event 530 in accordance with certain embodiments. The configuration map (ConfigMap) 510 (FIG. 5A) includes: the time range of when to collect the data, which types of resources will be collected, and whether or not to collect events, workload logs, metrics, etc.

The collected data is stored into the data hub's database, object storage, or disk files in distributed key-value store format, such as illustrated with table 540 (FIG. 5D), which is similar to what is stored in the distributed key-value store 427 in the customer cluster. This enables re-creating the original customer environment as the simulated customer environment in the container orchestration platform player.

The audit policy 520 (FIG. 5B) indicates, at the API server, that log specific resource changes at a RequestResponse level in a specific namespace are to be recorded in the audit log.

The audit event 530 (FIG. 5C) generated by the API server includes the detailed information that is sufficient to re-create and re-play the original customer environment as the simulated customer environment later in the container orchestration platform player. In this example, a service account called test is created by a system administrator in a default namespace.

The webhook backend sends events to an external API.

Each request may be recorded with an associated stage. The following are example stages for which audit logging may be enabled:

RequestReceived: The stage for events generated when the audit handler receives the request ResponseStarted: The stage once the response headers are sent, but before the response body is sent.

ResponseComplete: The stage when the response body has been completed.

System Failure: The stage when events are generated because a system failure occurred In various embodiments, the data captured for an event depends upon the audit level configured. The following are example audit levels:

No logging: Don't log events that match the audit policy.

Log Event Metadata: Log the event metadata, without logging the request or the response.

Log Event Metadata and Request: Log the event metadata and the request.

Log Event Metadata, Request, Response: Log the event metadata, the request, and the response.

Figure 6A:
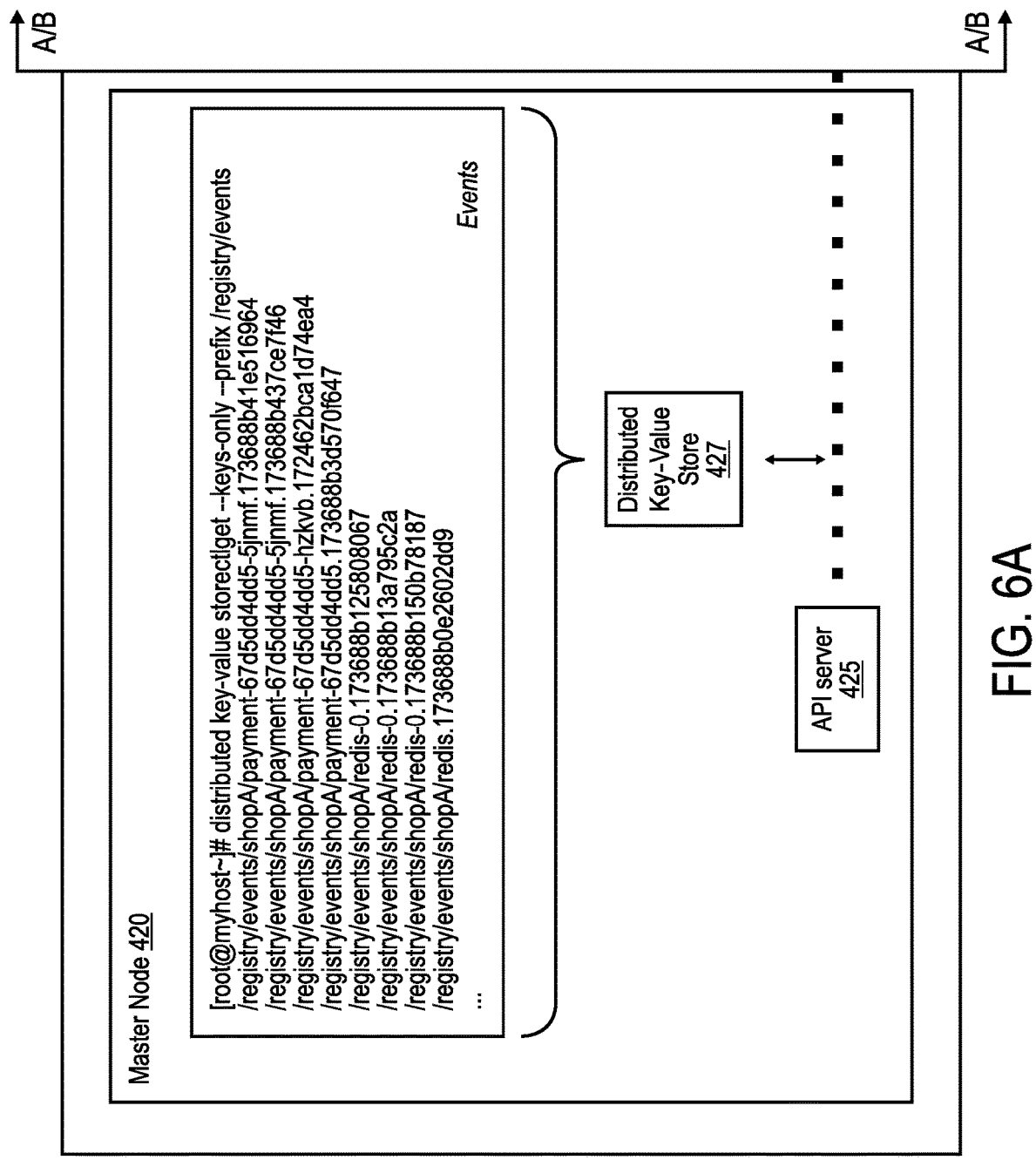
FIGS. 6A and 6B illustrate an example of recording events and logs in accordance with certain embodiments.
Figure 6B:
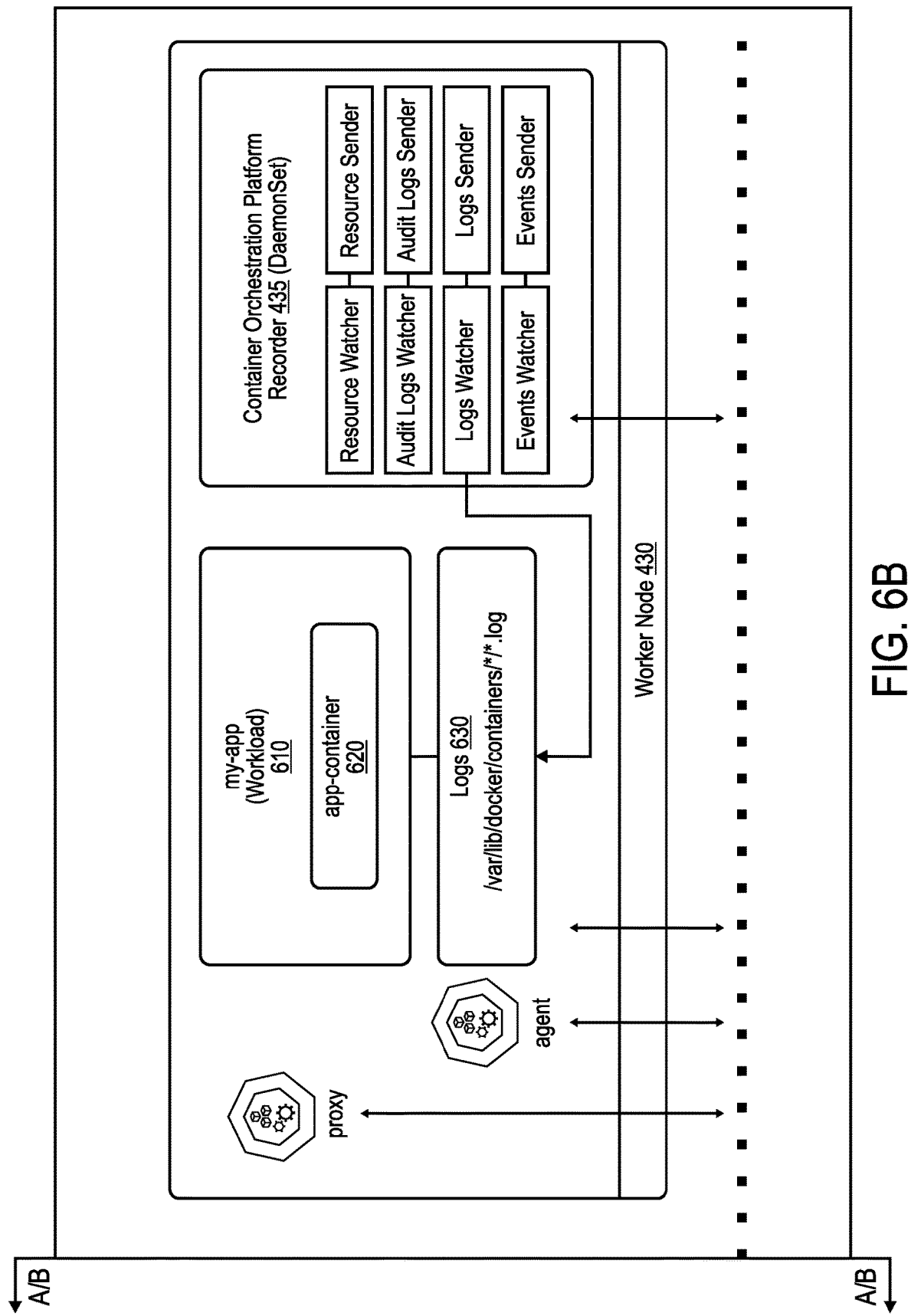

FIGS. 6A and 6B illustrate an example of recording events and logs in accordance with certain embodiments. The worker node 430 (of FIG. 4A) includes my-app (workload) 610 and logs 630. The my-app (workload) 610 includes an app-container 620.

In certain embodiments, events hold information about resource state changes or errors as well as other informational messages to provide insight into what is happening inside the original customer environment. The events are a type of resource (e.g., API objects) that are stored in the API server on the master node, and the events may be retrieved from the distributed key-value store 427. The events watcher in the worker node may be used to collect events. In certain embodiments, these events are removed an hour after the last occurrence of an event to save storage space. Therefore, the issue resolution system 210 captures events over a period of time using the container orchestration platform recorder.

For workload logs, the workloads communicate runtime information via operations (i.e., commands, such as: stdout for normal output and stderr for error and diagnostic messages), and these operations are compiled into log files locally on each worker node. Rotational policies may be used to interact periodically with these logs to keep things up to date and optimized.

The container orchestration platform recorder has access to the directory with logs from the application containers on a node. The container orchestration platform recorder collects container logs along with both node logs and cluster (or system component) logs. In certain embodiments, logs watcher of the worker node accesses the log directories and collects the logs from the workloads on the node continuously. In addition, the logs watcher may collect workload logs, but also node logs and cluster or system level logs, to provide full observability into the target cluster.

Figure 7:
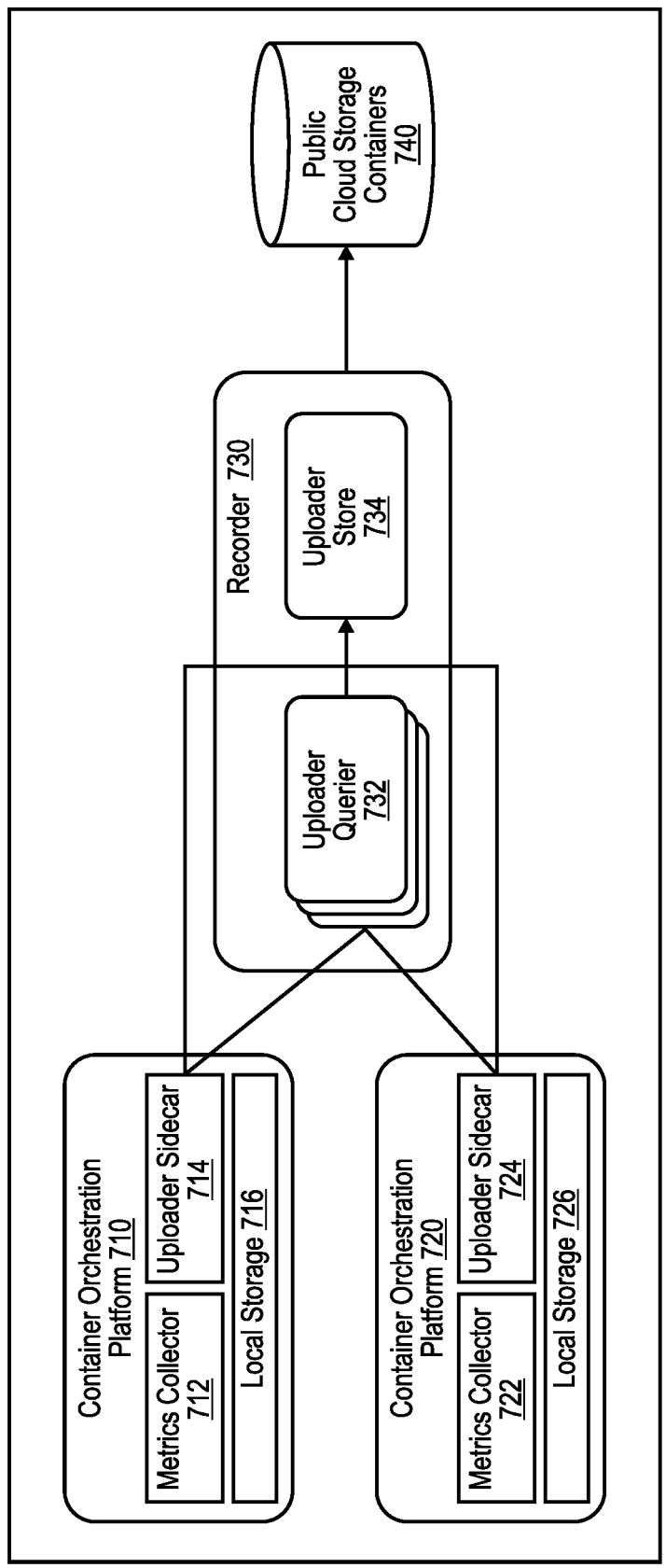
FIG. 7 illustrates recording metrics in accordance with certain embodiments.

FIG. 7 illustrates recording metrics in accordance with certain embodiments. A first container orchestration platform 710 includes a metrics collector 712, an uploader sidecar 714, and local storage 716. A second container orchestration platform 720 includes a metrics collector 722, an uploader sidecar 724, and local storage 726. The container orchestration platforms 710, 720 are connected to a recorder 730, which is connected to one or more public cloud storage containers 740.

In certain embodiments, an uploader is capable of integrating with the metrics collector deployment, enabling a highly available metric system with long-term, scalable storage. Embodiments provide three uploader components: an uploader sidecar 714, 724, an uploader querier 732, and an uploader store 734. The uploader sidecar runs with every metrics collector instance. The uploader sidecar uploads metrics collector data periodically (e.g., every two hours) to a public cloud storage container 740 (or other storage). The uploader sidecar 714, 724 also serves real-time metrics that are not uploaded to the public cloud storage container 740. The uploader store 734 serves metrics from the public cloud storage container 740. The uploader querier 732 has a user interface similar to that of the metrics collector and handles metrics collector query APIs. The uploader querier 732 queries the uploader store 734 and the uploader sidecar 714, 724 to return relevant metrics. If there are multiple metrics collector instances set up, the uploader querier 732 also de-duplicates the metrics.

In certain embodiments, the container orchestration platform player 240 is a lightweight container orchestration platform control plane with an Application Programming Interface (API) server, a distributed key-value store, and other modules that manage environment data that are recorded from the original customer environment. In certain embodiments, the container orchestration platform player 240 is considered to be lightweight because other components (e.g., a controller manager, a scheduler, an agent, etc.) are not used since the container orchestration platform player 240 does not deploy real workloads, but instead, plays the simulated customer environment to reflect the status of the original customer environment.

In certain embodiments, the container orchestration platform player 240 is considered to be immutable because the container orchestration platform player 240 supports one or more GET requests for environment status exploration and analysis either manually or automatically, while the container orchestration platform player 240 does not support other operations (e.g., commands, such as POST, PUT, PATCH, and DELETE) because the container orchestration platform player 240 does not actually deploy workloads or modify resource metadata in the simulated customer environment.

In certain embodiments, the distributed key-value store of the container orchestration platform player 240 is used to store the resources (e.g., container orchestration platform objects) and interacts with the API server. For the distributed key-value store of the container orchestration platform player 240, the resources originate from the original customer environment (i.e., the resources are not created by the container orchestration platform player 240).

Figure 8A:
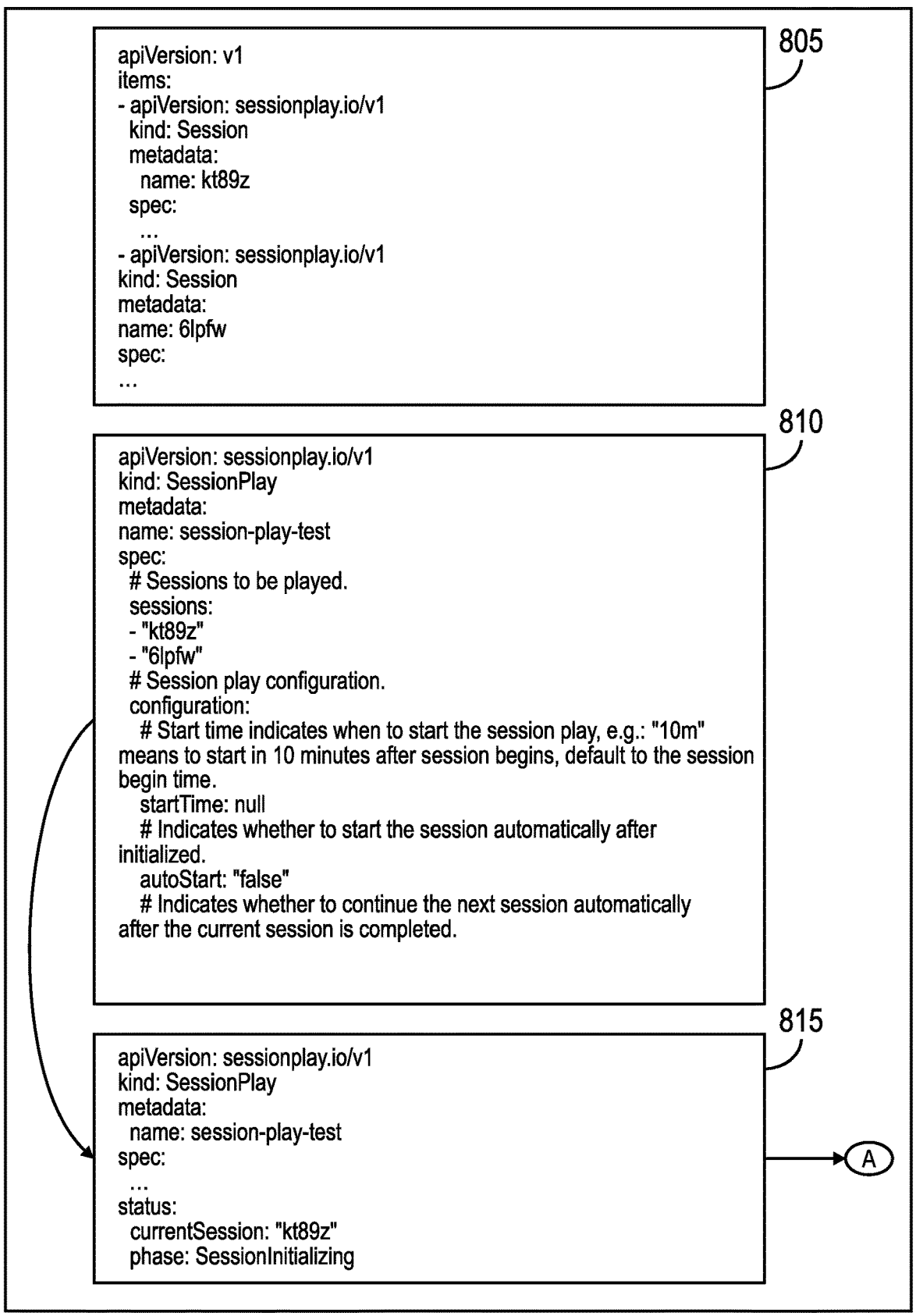
FIGS. 8A, 8B, and 8C illustrate pseudocode for playing the simulated customer environment in accordance with certain embodiments.
Figure 8B:
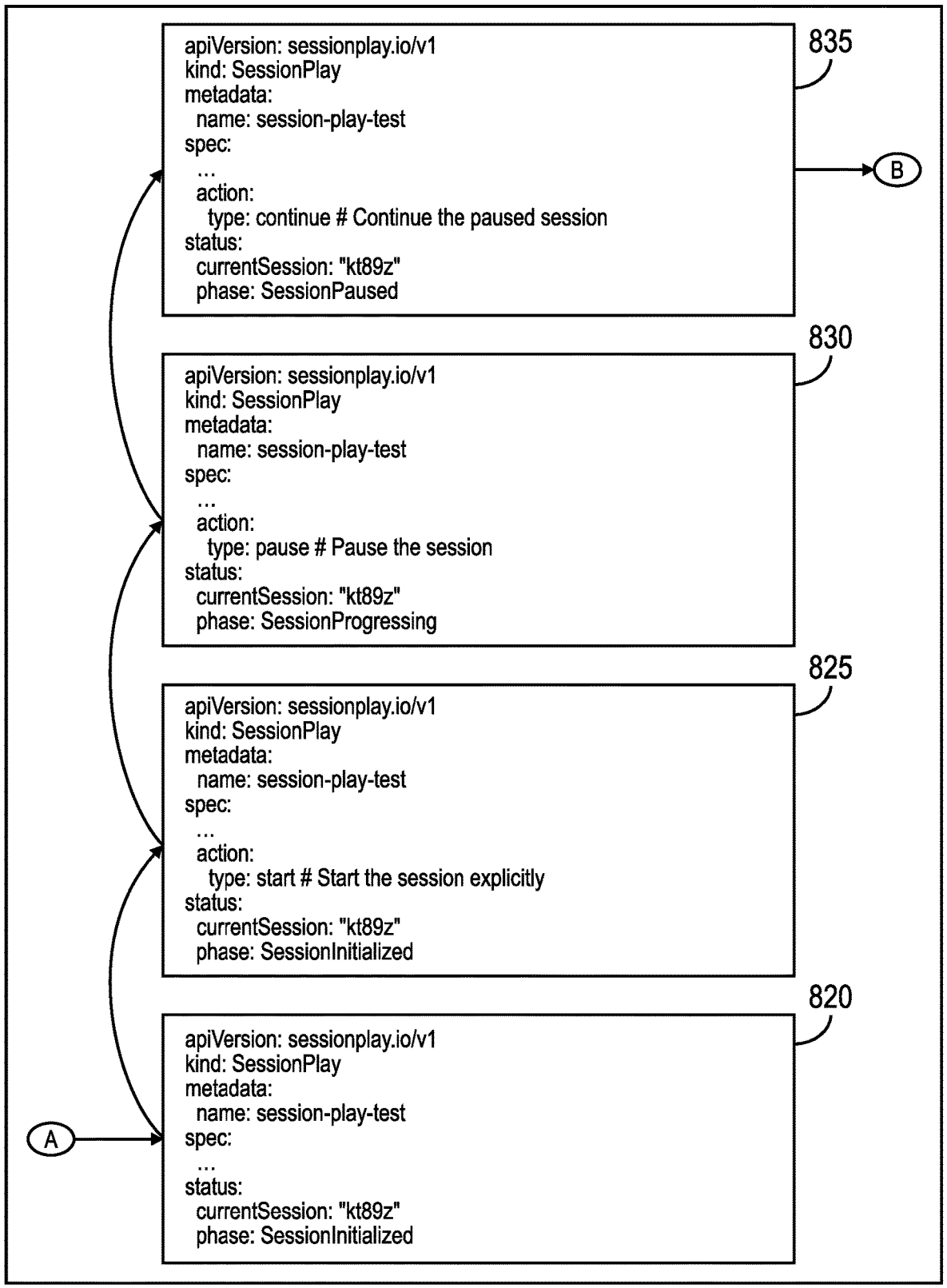
Figure 8C:
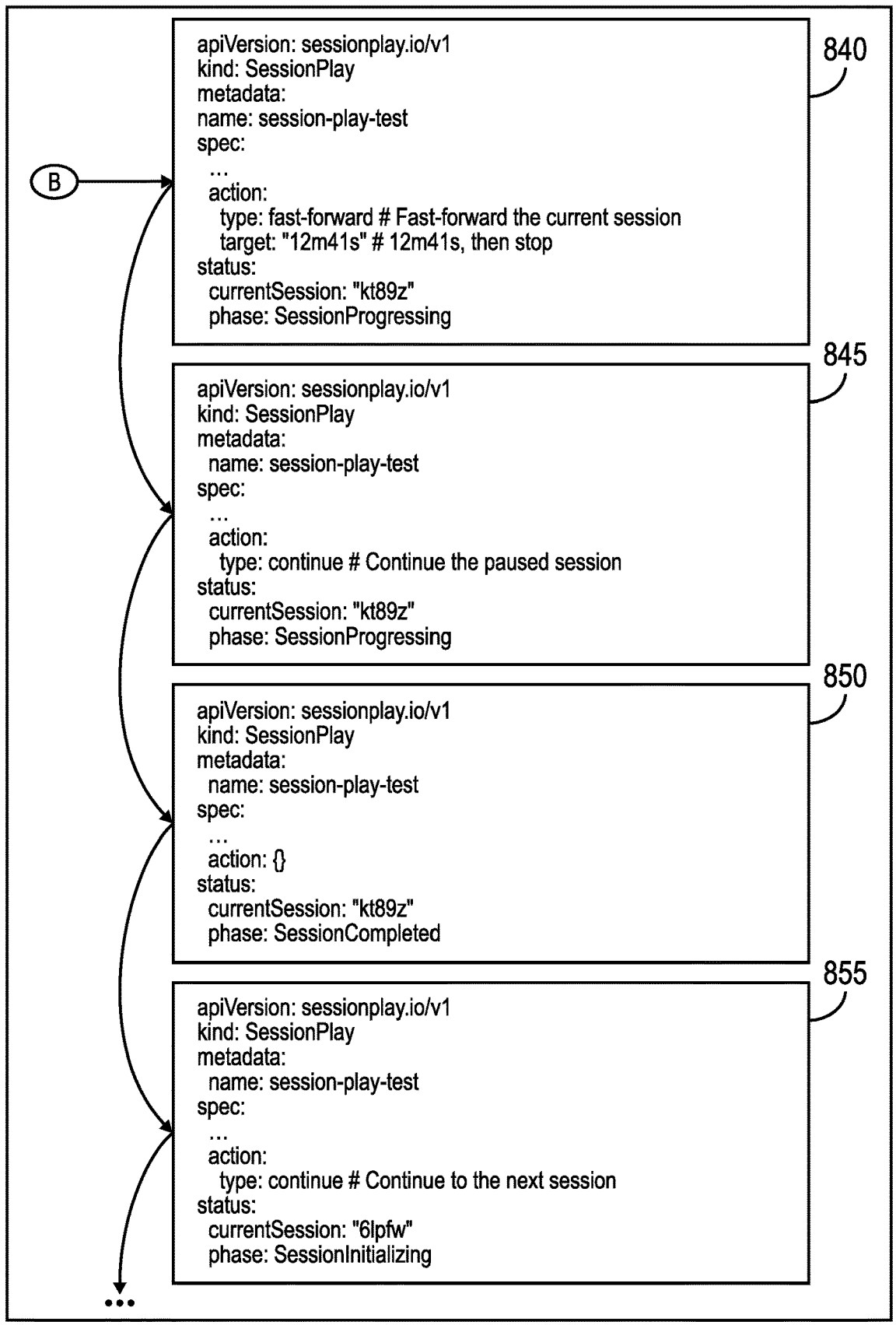

FIGS. 8A, 8B, and 8C illustrate pseudocode for playing the simulated customer environment in accordance with certain embodiments. The issue resolver 250 supports session play and a point in time experience among multiple sessions. The issue resolver 250 provides a set of APIs that allows control in playing the simulated customer environment. This set of APIs include: start, pause, continue, fast-forward, rewind, position, etc.

In FIGS. 8A, 8B, and 8C, there are snippets of pseudocode in a human-readable data serialization language. Snippet 805 lists multiple sessions that are recorded by the issue resolver 250. Session "kt89z" is played in snippets 810-850, while session "6lpfw" is started in snippet 855.

Snippet 810 starts two of the sessions listed in the snippet 805 by creating a SessionPlay. The issue resolver 250 allows configuring how these sessions will be played. Snippet 815 shows that the session controlled by the newly created SessionPlay has progressed to a SessionInitializing phase, which may be seen by checking the SessionPlay status.phase field.

Snippet 820 shows that the session has progressed to SessionInitialized. This means that the distributed key-value store of the container orchestration platform player 240 has been populated with full records at time T0 to time T1, which allows fast forwarding from time T0 to time T1 during play. Snippet 825 shows the session may be started manually by a "start" action in the SessionPlay spec.action-.type field if that session is configured as autoStart with false. Snippet 830 shows that the session has advanced to SessionProgressing after being started, and then the user updates the action to pause the session. Snippet 835 shows that the session has advanced to SessionPaused after being paused, and then the user updates the action to continue the paused session.

Snippet 840 shows that the session has advanced to SessionProgressing after being continued, and then the user updates the action to fast-forward the session to 12 minutes and 41 seconds (12 m41 s) from the current time. Snippet 845 shows that the session has paused again after being fast-forwarded, and then the user updates the action to continue the session. Snippet 850 shows that the session has advanced to SessionCompleted as the session has reached the end. Snippet 855 shows that the session has advanced to SessionInitializing again after the user updates the action to continue to the next session. At this point, the SessionPlay status.currentSession value has been changed.

Figure 9:
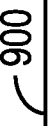
FIG. 9 illustrates example Application Programming Interfaces (APIs) in accordance with certain embodiments.

FIG. 9 illustrates example APIs in accordance with certain embodiments. The example APIs include a get a workload API, a get all events for a workload API, a get a workload logs API, and a list workloads in a namespace API.

Figure 10:
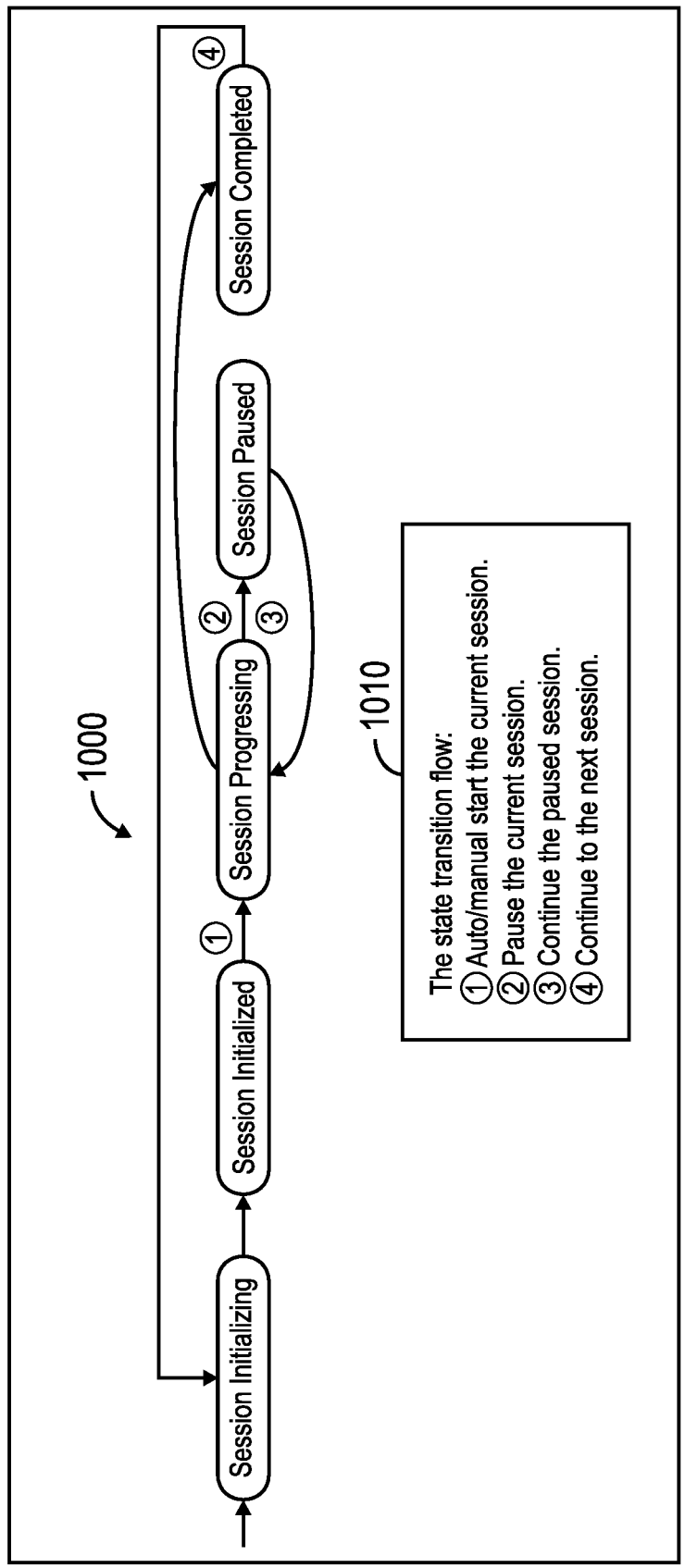
FIG. 10 illustrates state transitions in accordance with certain embodiments.

FIG. 10 illustrates state transitions 1000 in accordance with certain embodiments. For the state transitions 1000, the session initializes, the session is initialized, and then the state transition flows 1010 occur. The state transition flows 1010 indicate: 1)) automatic/manual starting of the current session; 2) pausing of the current session; 3) continuing the current session; and 4) continuing to a next session.

Figure 11:
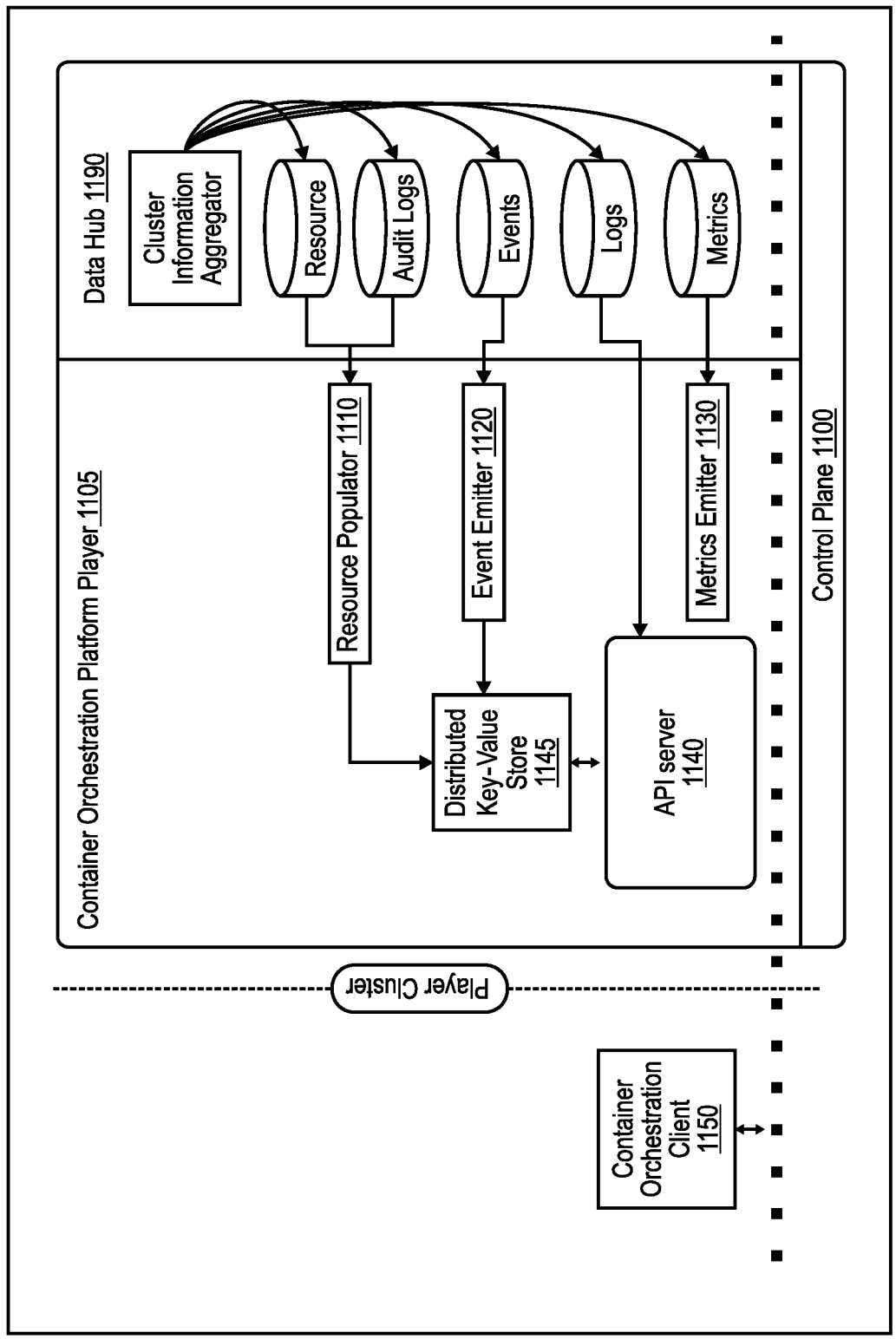
FIG. 11 illustrates a control plane in accordance with certain embodiments.
Figure 12A:
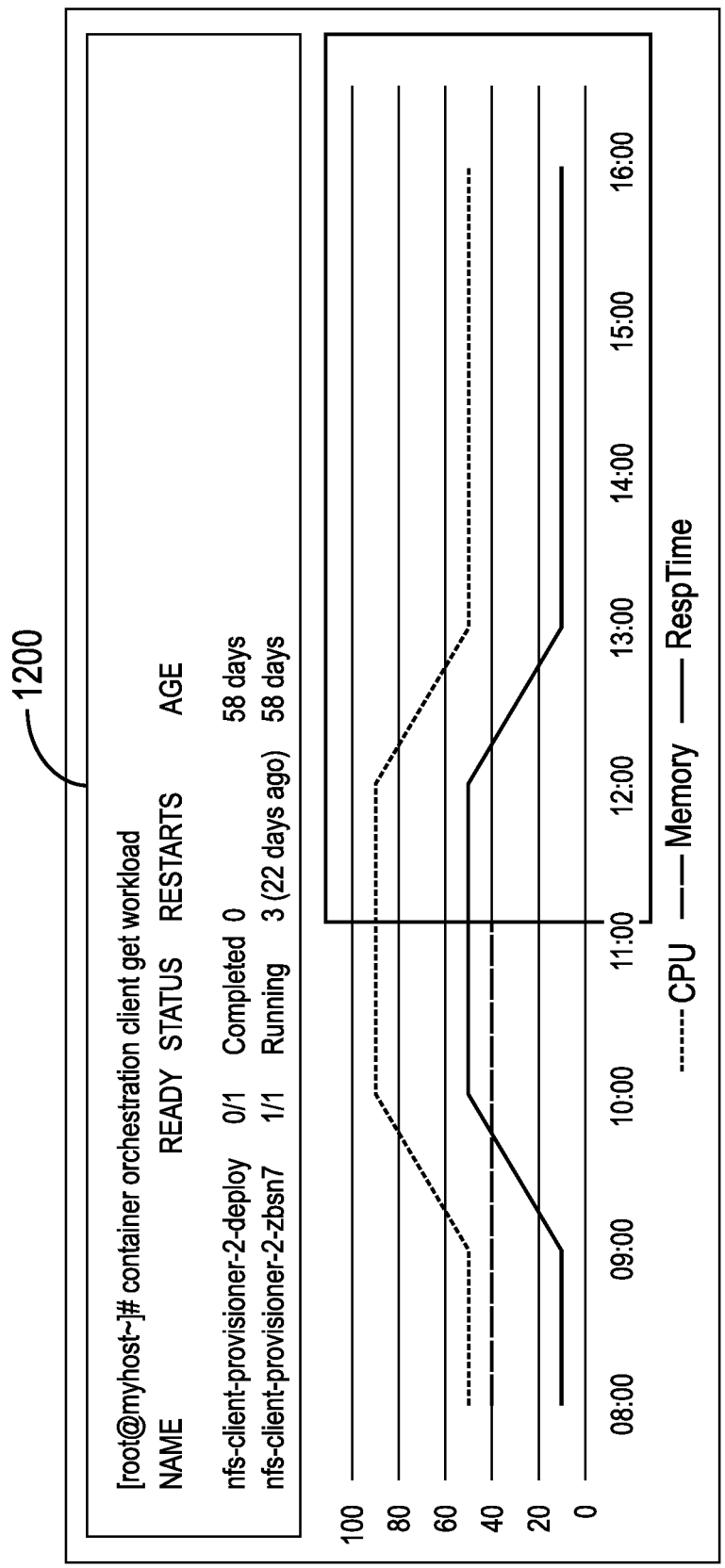
Figure 12C:
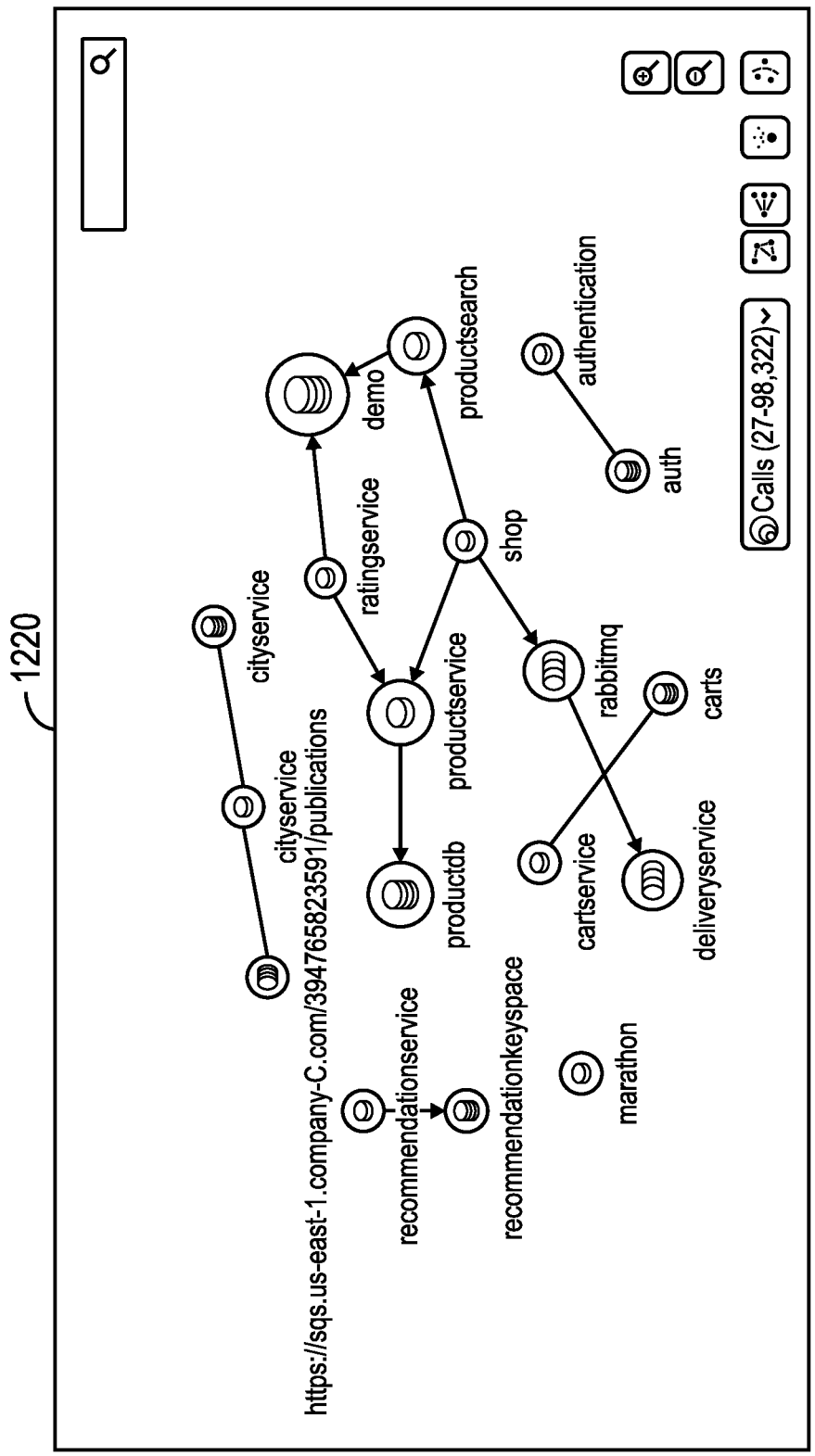
Figure 12D:
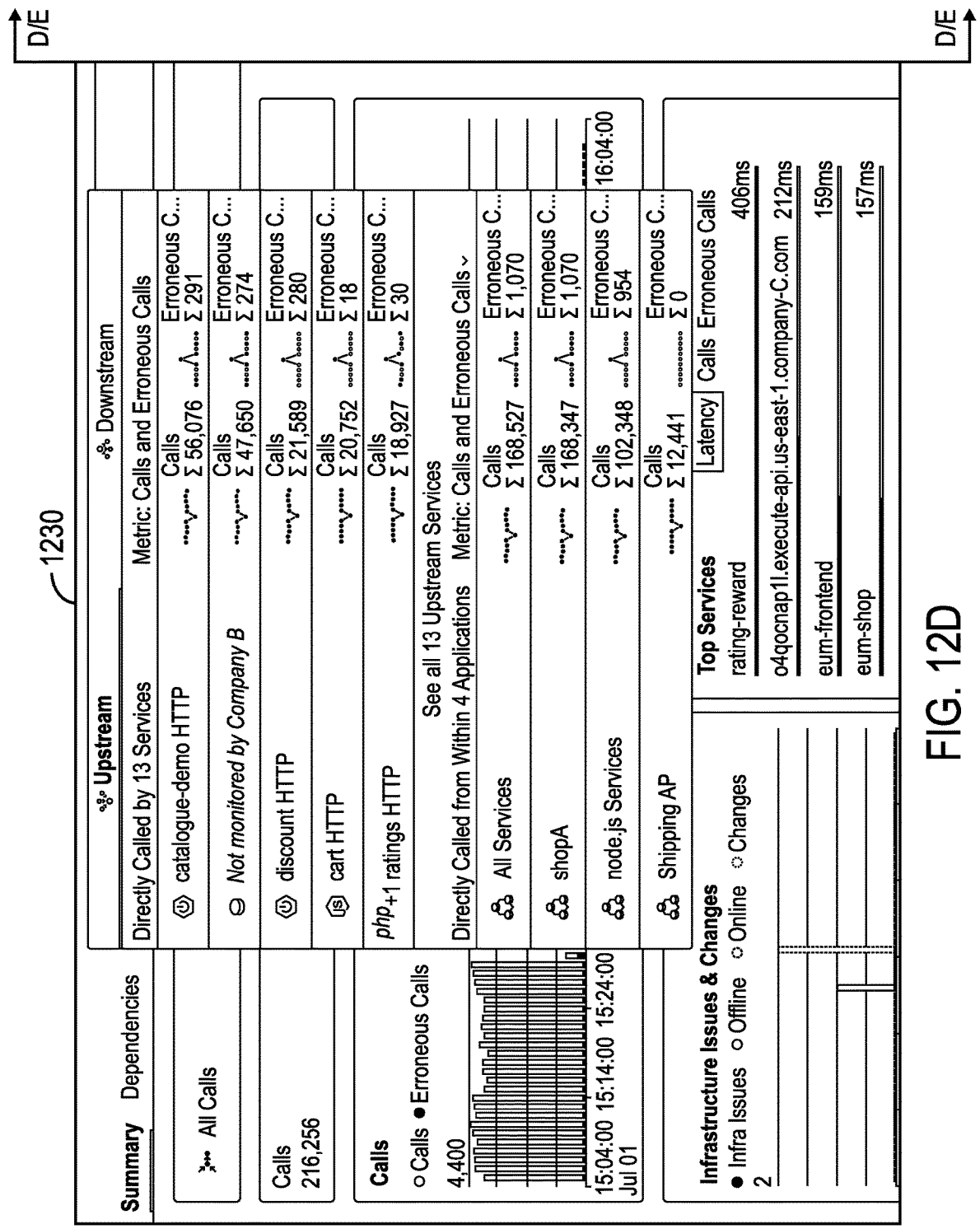
Figure 12E:
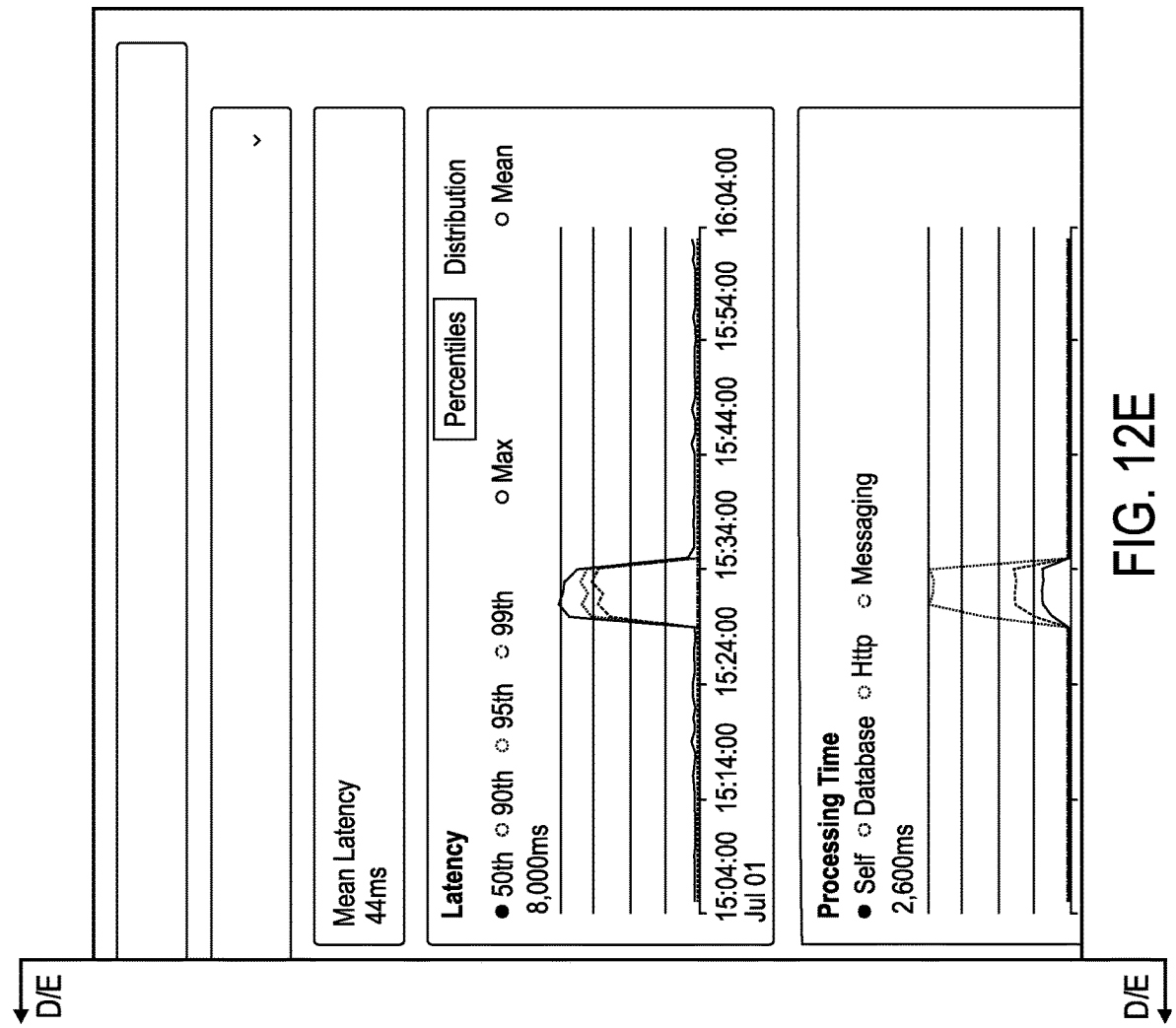

FIG. 11 illustrates a control plane 1100 in accordance with certain embodiments. The control plane 1100 includes a container orchestration platform player 1105, which is an example of a container orchestration platform player 240. The container orchestration platform player 1105 includes a resource populator module 1110, an event emitter module 1120, a metrics emitter module 1130, and an API server 1140 connected to a distributed key-value store 1145. The container orchestration platform player 1105 is connected to a container orchestration client 1150. In certain embodiments, the distributed key-value store 1145 of the container orchestration platform player 1105 in the player cluster stores a copy of the data in the distributed key-value store 427 of the master node 420 in the customer cluster.

In certain embodiments, the modules that manage the environment data include: the resource populator module 1110, the event emitter module 1120, and the metrics emitter module 1130.

In certain embodiments, for events, workload logs, and metrics, data is rolled out gradually by following the timeline. That means when the container orchestration client 1150 requests a play (or replay) from the API server 1140, the simulated customer environment is played according to the timeline and events/data/resources/etc. appear in accordance when that was available in the original customer environment timeline. For example, if an event occurred at time T10 in the original customer environment, then the event occurs at time T10 in the simulated customer environment. Also, if a resource is changed at time T15 in the original customer environment, then the resource is changed at time T15 in the simulated customer environment.

The resource populator module 1110 plays the events that occurred in the original cluster environment in the container orchestration platform player 1105, with the help of collected resource metadata and audit logs. The resource populator module 1110 initially populates the distributed key-value store 1145 with the stored resources as a base, then starts to parse and interpret audit logs to perform Create, Update, Delete (CUD) operations (i.e., "commands") against the base by following the timeline. This allows the environment status to be exposed by the API server 1140 as a rollout over the timeline.

The event emitter module 1120 reads events recorded in the original customer environment and stores ("emits") them into the distributed key-value store 1145 by following the timeline as if they happened in this control plane. The metrics emitter module 1130 exposes the metrics data via corresponding metrics endpoints.

In addition, the API server 1140 loads the log data from the data hub directly and exposes the log data via corresponding APIs. Thus, via the APIs, the container orchestration platform player 1105 consumes the log data.

In certain embodiments, the container orchestration platform player 1105 enables playing the simulated customer environment at any specified timestamp, which enables a viewer to experience "time travel" to that specified time stamp. The container orchestration platform player 1105 receives the specified timestamp and initially finds the nearest time stamp having a distributed key-value store 1145 full record as the start point, cleans existing data in the distributed key-value store 1145, re-populates the distributed key-value store 1145 with original resource data from the data hub 1190 (which is an example of data hub 450 with a description of the stored data), and re-interprets audit logs quickly and stops at the specified timestamp (i.e., fast forwards from the nearest time stamp to the specified time stamp). From then on, the container orchestration platform player 1105 rolls out the changes to the resource according to the audit logs through the timeline at a regular pace. This processing may also be applied to events.

Since the collected data from the original customer environment is backed up along with the distributed key-value store 1145 in the player cluster, the distributed key-value store 1145 may be refreshed, and the playing of the simulated customer environment may happen at any time. Thus, the container orchestration platform player 1105 is able to reproduce events and resources of interest repeatedly at any specified time stamp. This is very useful when resolving issues (e.g., debugging customer issues).

FIGS. 12A, 12B, 12C, 12D, and 12E illustrate user interfaces of container orchestration clients in accordance with certain embodiments. In certain embodiments, the same simulated customer environment may be consumed by different types of container orchestration clients, such as command line tools for cluster status manual exploration and more sophisticated observability software for cluster status auto-analysis. The container orchestration clients gain the same timeline experience of replaying the original customer environment. That is, the same timeline experience is available to third-party tools consistently and transparently as the container orchestration platform player 1105 controls the timeline and the data, while the third-party tool consumes the simulated customer environment.

User interface 1200 (FIG. 12A) illustrates a text-based command line tool interacting with the container orchestration platform player. User interface 1210 (FIG. 12B) illustrates another text-based command line tool with a more advanced look and feel. A user may use these tools to manually explore the customer environment status emitted by the container orchestration platform player. The user interfaces 1220 (FIG. 12C), 1230 (FIGS. 12D-12E) illustrate advanced observability software that may be used to analyze the customer environment when consuming the environment data emitted by the container orchestration platform player.

Figure 13A:
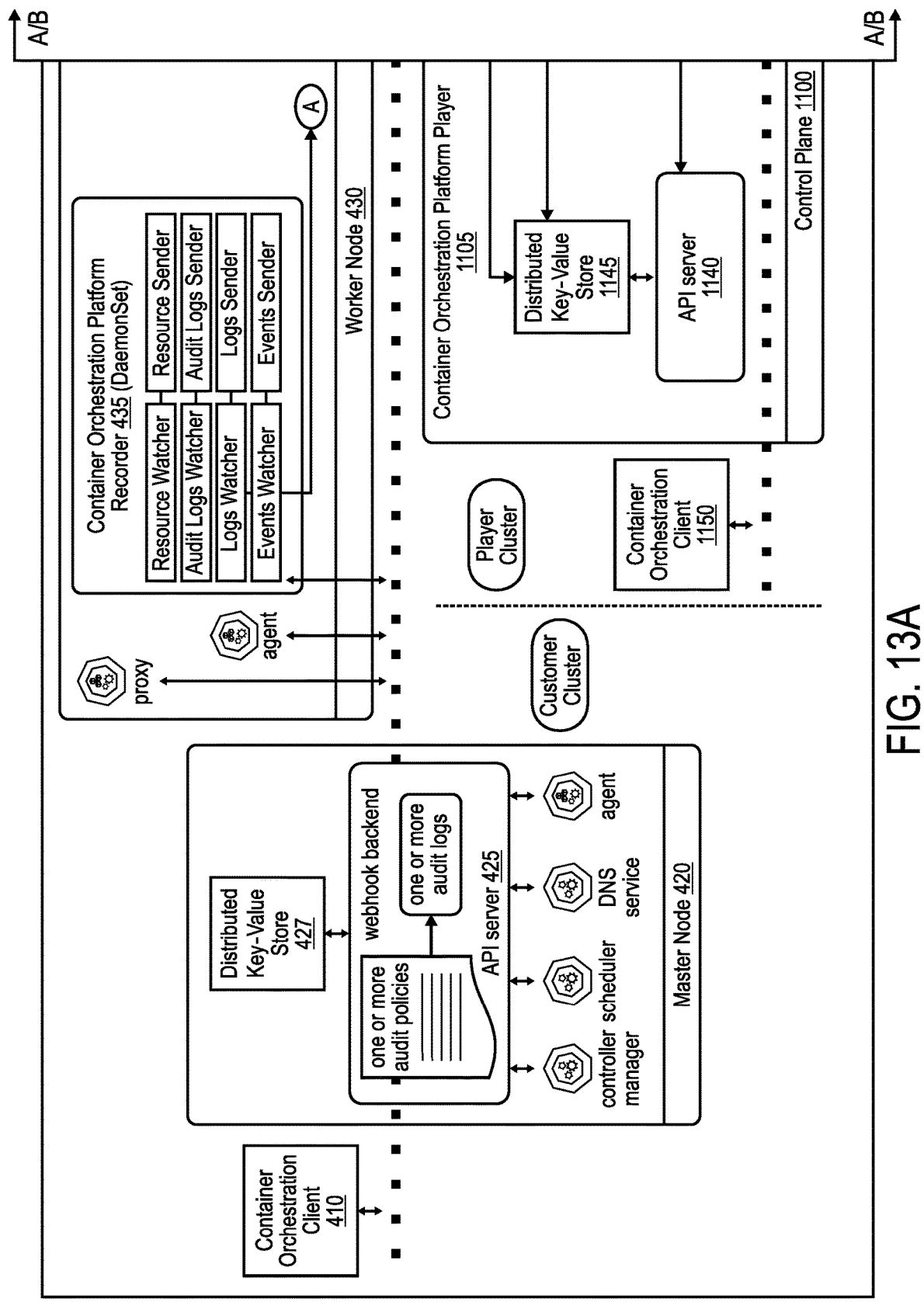
FIGS. 13A and 13B illustrate an overall system architecture in accordance with certain embodiments.
Figure 13B:
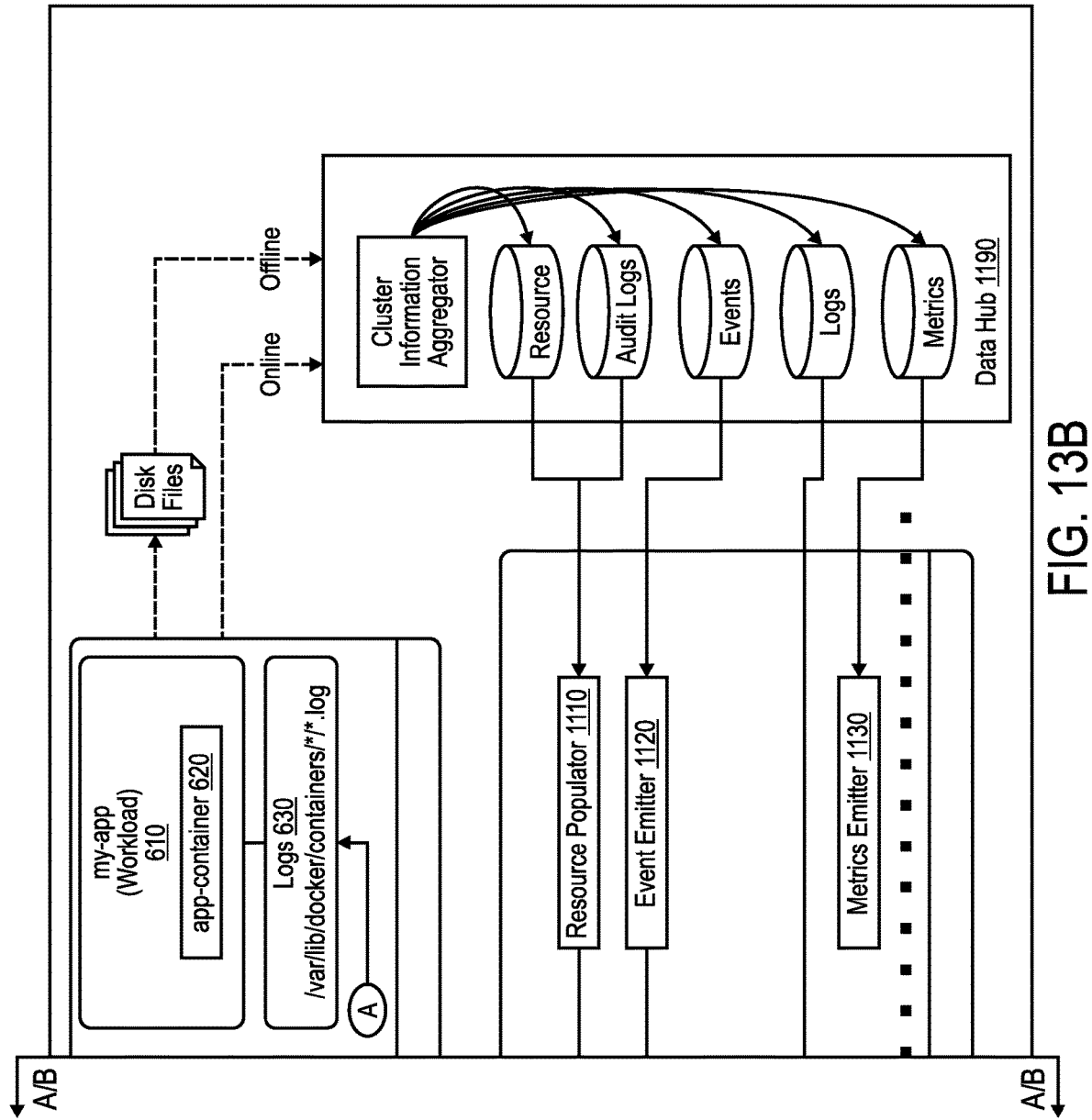

FIGS. 13A and 13B illustrate an overall system architecture in accordance with certain embodiments. The master node 420 in the customer cluster, the worker node 430 in the customer cluster, and the control plane 1100 in the player cluster are connected to each other and are able to communicate with each other. Embodiments provide the container orchestration platform recorder 435, the data hub 1190, and the container orchestration platform player 1105.

In certain embodiments, the master node 420 is physically remote from the worker node 430, the control plane 1100, and the data hub 1190.

In the customer cluster, the API server 425 generates the audit logs configured by audit policy and deploys the agent on each worker node 430 to collect specified container orchestration platform resources, audit logs, workload logs, events, etc.

The container orchestration platform recorder 435 collects data from the agent into disk files in offline mode if the customer environment has limited network connectivity and, otherwise, into the data hub 1190 in online mode. The data from the disk files are later moved to the data hub 1190.

In particular, the data is loaded from the data hub 1190 into the distributed key-value store 1145 in the container orchestration platform player 1105 in response to user requests to replay what happened in the original customer environment. This enables users, such as developers, to assist the customer with issue debugging.

Figure 14:
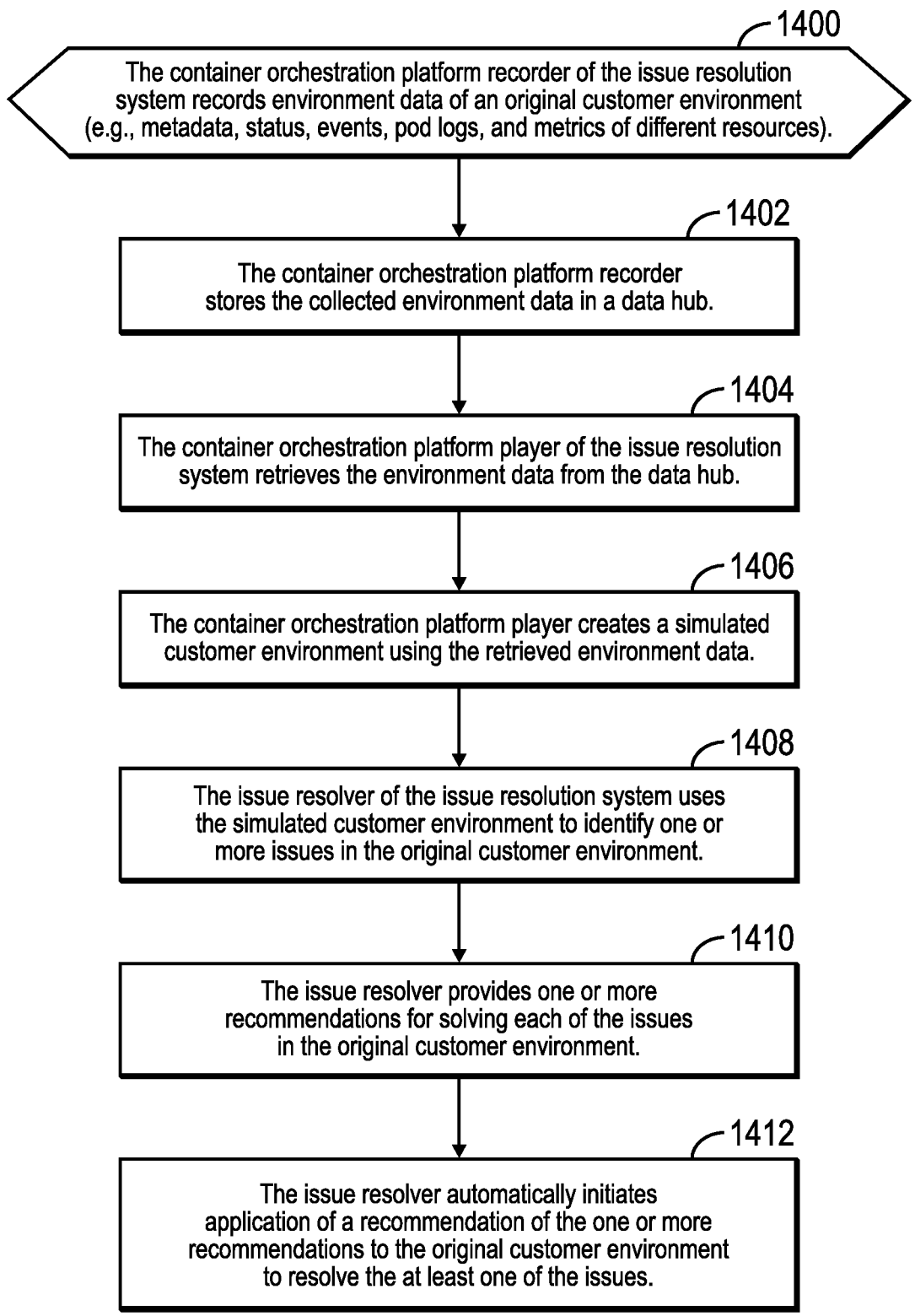
FIG. 14 illustrates, in a flowchart, operations for automatically resolving an issue in an original customer environment in accordance with certain embodiments.

FIG. 14 illustrates, in a flowchart, operations for automatically resolving an issue in an original customer environment in accordance with certain embodiments. Control begins at block 1400 with the container orchestration platform recorder 220 of the issue resolution system 210 recording (i.e., collecting) environment data of an original customer environment (e.g., metadata, status, events, workload logs, and metrics, of different resources). In block 1402, the container orchestration platform recorder 220 stores the collected environment data in a data hub 230.

In block 1404, the container orchestration platform player 240 of the issue resolution system retrieves the environment data from the data hub 230. In certain embodiments, the container orchestration platform player 240 performs retrieval of the environment data in response to receiving a user request to start creation of the simulated customer environment 245. In other embodiments, the container orchestration platform player 240 performs retrieval of the environment data based on checking the value of an auto-start indicator. In certain embodiments, the auto-start indicator has a first value that indicates that the container orchestration platform player 240 is to automatically start creation of the simulated customer environment 245 and has a second value that indicates that the container orchestration platform player 240 is not to automatically start creation of the simulated customer environment 245.

In block 1406, the container orchestration platform player 240 creates a simulated customer environment 245 using the retrieved environment data. In block 1408, the issue resolver 250 of the issue resolution system 210 uses the simulated customer environment 245 to identify one or more issues in the original customer environment. In block 1410, the issue resolver 250 provides one or more recommendations for solving each of the issues in the original customer environment. With embodiments, providing the one or more recommendations includes identifying one or more solutions for the one or more issues, where the one or more solutions are included with the one or more recommendations. In certain embodiments, providing the one or more recommendations includes sending the one or more recommendations to the customer environment for application at the customer site. In block 1412, the issue resolver 250 automatically initiates application of a recommendation of the one or more recommendations to the original customer environment to resolve the at least one of the issues. For example, the issue resolver 250 may instruct the API server 425 to apply the recommendation, and the API server 425 changes the original customer environment by applying the recommendation (e.g., changing the value of a variable, changing a time for performing an event, allocating more storage and/or memory to a particular workload, etc.) to correct the issue.

Figure 15:
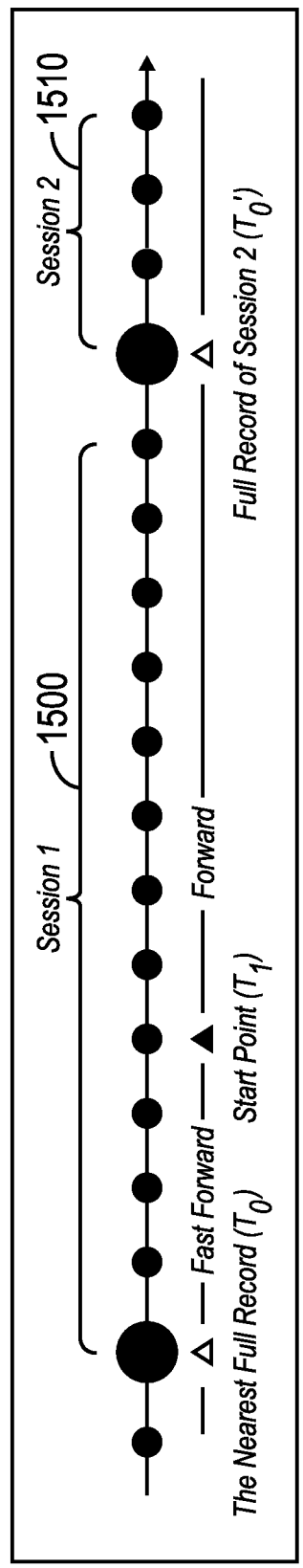
FIG. 15 illustrates sessions of a simulated customer environment in accordance with certain embodiments.

FIG. 15 illustrates sessions of a virtual customer environment in accordance with certain embodiments. FIG. 15 illustrates sessions in accordance with certain embodiments. In FIG. 15, there is a first session 1500 and there is a second session 1510. In response to receiving selection of a time, the issue resolver 250 identifies time T0 as the beginning of the first session 1500.

Figure 16A:
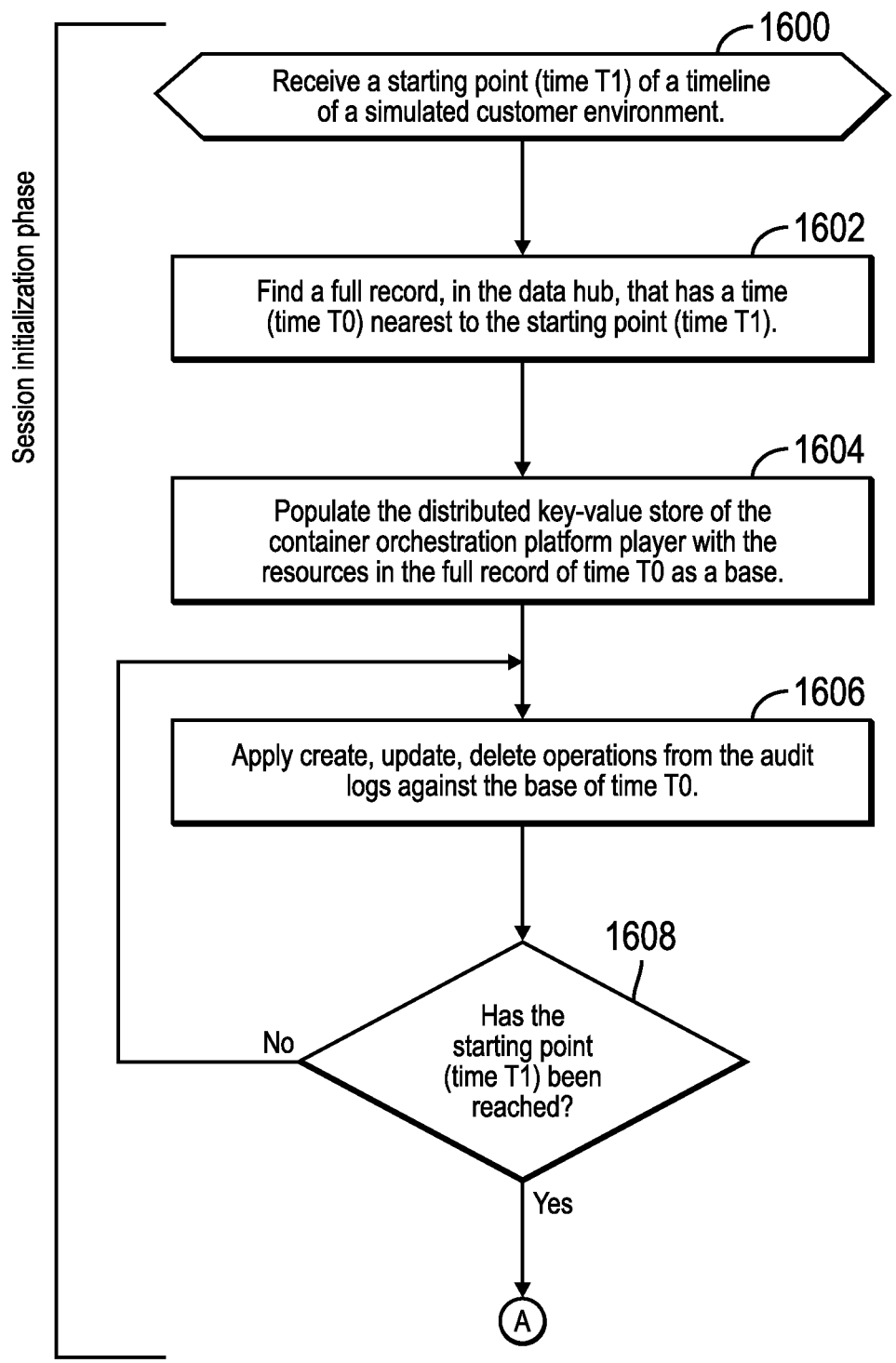
FIGS. 16A and 16B illustrate, in a flowchart, operations for playing sessions of the simulated customer environment in accordance with certain embodiments.
Figure 16B:
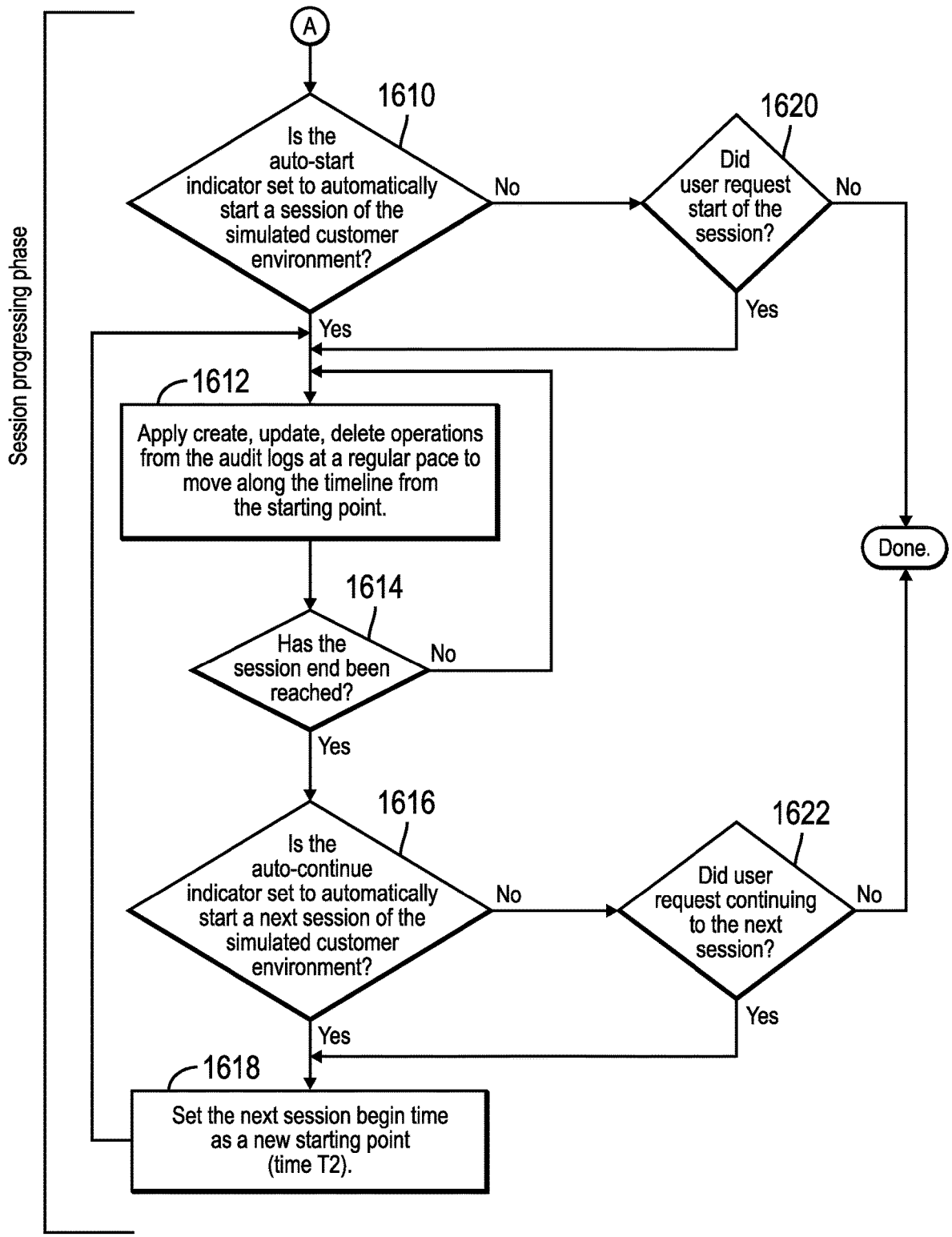

FIGS. 16A and 16B illustrate, in a flowchart, operations for playing sessions of the simulated customer environment in accordance with certain embodiments. In certain embodiments, a session is a portion of the simulated customer environment. In certain embodiments, the session is played by displaying a base simulated customer environment and applying changes (e.g., create, update, and delete operations) made to the simulated customer environment to move along the timeline of the simulated customer environment.

Control begins at block 1600 with the container orchestration platform player 240 receiving (e.g., from a user) a starting point (time T1) of a timeline of a simulated customer environment 245.

In a customer environment, the container orchestration platform recorder 220 may not keep recording continuously. Instead, the container orchestration platform recorder 220 may collect environment data around interesting points and for a certain period of time (e.g., one hour before and after an issue occurred). If the user does not specify an ending point, then the container orchestration platform player 240 moves forward by following the timeline until no new environment data is found in the current session. If the user does specify an ending point, the then the container orchestration platform player 240 plays to the ending point or until no new environment data is found in the current session. In particular, if the ending point is earlier than the time when the environment data in the current session is consumed, then the container orchestration platform player 240 stops playing at that earlier time.

In block 1602, the container orchestration platform player 240 finds a full record, in the data hub 230, that has a time (time T0) nearest to the starting point. In certain embodiments, finding the full record includes following the timeline backwards from the starting point time T1 to find a session whose begin time is the largest one among other sessions but is less than time T1. In certain embodiments, the full record includes the resources collected as a base at a particular time. The full record may be said to represent a snapshot of the customer cluster at T0, which allows the container orchestration platform player 240 to re-build the customer cluster in the player cluster. From then on, the container orchestration platform player 240 uses audit logs for the CUD operations happening after T0, to apply these operations to this base, so as to reflect the changes happening after T0 in this customer cluster.

In block 1604, container orchestration platform player 240 populates the distributed key-value store of the container orchestration platform player 240 with the resources in the full record of time T0 as a base.

In block 1606, container orchestration platform player 240 applies CUD operations from the audit logs against the base of time T0. The audit logs with a timestamp after time T0 are used. Applying the CUD operations including parsing the audit logs to identify the relevant CUD operations for the session. In certain embodiments, the CUD operations are applied quickly so that the simulated customer environment appears to be "fast forwarded".

In block 1608, container orchestration platform player 240 determines whether the starting point (time T1) has been reached. If so, processing continues from block 1608 (FIG. 16A) to block 1610 (FIG. 16B), otherwise, processing continues to block 1606.

In certain embodiments, the container orchestration platform player 240 interprets the audit logs starting from the time the full record was taken (time T0) and follows the timeline to apply the CUD operations against the base progressively, until getting to the start point (time T1). The operations of block 1606 are skipped when time T1 equals time T0. Then, the container orchestration platform player 240 pauses to check the auto-start indicator or to check for an indication to start from the user.

In block 1610, container orchestration platform player 240 determines whether the auto-start indicator is set to automatically start a session of the simulated customer environment. If so, processing continues to block 1612, otherwise, processing continues to block 1620.

In block 1612, container orchestration platform player 240 applies CUD operations from the audit logs at a regular pace to move along the timeline from the starting point. Applying the CUD operations including parsing the audit logs to identify the relevant CUD operations for the session. In certain embodiments, the regular pace may be described as the pace at which the CUD operations occurred in the original customer environment.

In block 1614, container orchestration platform player 240 determines whether the session end has been reached. If so, processing continues to block 1616, otherwise, processing continues to block 1612.

In block 1616, container orchestration platform player 240 determines whether the auto-continue indicator set to automatically start a next session of the simulated customer environment. If so, processing continues to block 1618, otherwise, processing continues to block 1622. In certain embodiments, the auto-continue indicator has a first value that indicates that the container orchestration platform player 240 is to automatically start a next session and has a second value that indicates that the container orchestration platform player 240 is not to automatically start the next session.

In block 1618, container orchestration platform player 240 sets the next session begin time as a new starting point (time T2).

In block 1620, container orchestration platform player 240 determines whether a user requested the start of the session. If so, processing continues to block 1612, otherwise, processing is done.

In block 1622, container orchestration platform player 240 determines whether the user requested continuing to the next session. If so, processing continues to block 1618, otherwise, processing is done.

In certain embodiments, blocks 1600-1608 are considered to be part of a session initialization phase, while blocks 1610-1622 are considered to be part of a session progressing phase.

In certain embodiments, the container orchestration platform player 240 adjusts timestamps in the environment data to reflect the current timeline.

Figure 17:
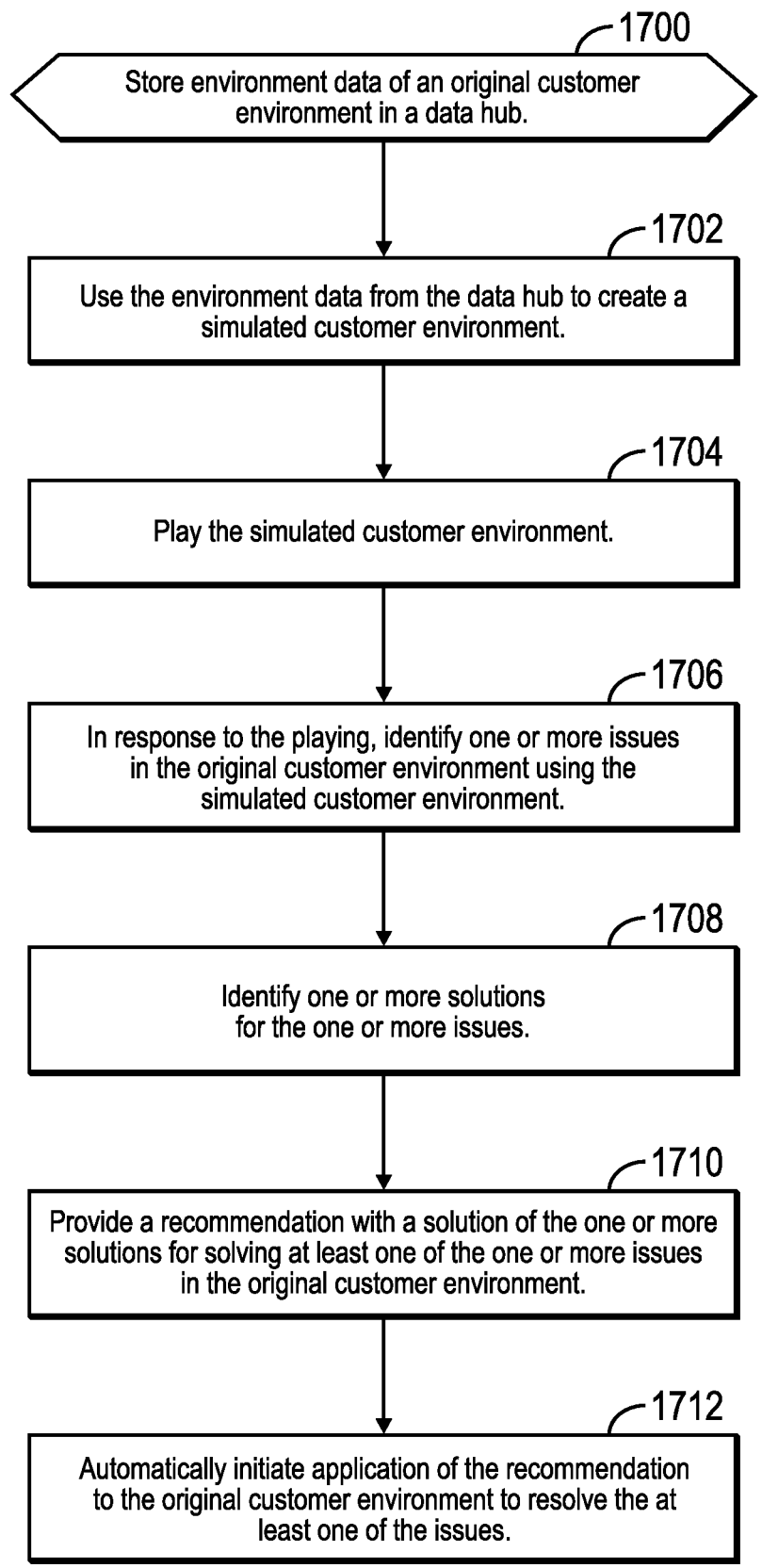
FIG. 17 illustrates, in a flowchart, operations for resolving issues by building a re-playable simulated customer environment of a container orchestration platform in accordance with certain embodiments.

FIG. 17 illustrates, in a flowchart, operations for resolving issues by building a re-playable simulated customer environment of a container orchestration platform in accordance with certain embodiments. Control begins at block 1700 with the issue resolution system 210 storing environment data of an original customer environment in a data hub. Storing the environment data includes recording the environment data of the original customer environment and transporting the environment data to a data hub, wherein the environment data comprises metadata, status, events, workload logs, and metrics of one or more resources. The data hub may be remote from the original customer environment.

In block 1702, the issue resolution system 210 uses the environment data from the data hub to create a simulated customer environment. The operations of block 1702 may include the issue resolution system 210 retrieving the environment data from the data hub and storing the environment data in a distributed key-value store. In certain embodiments, the original customer environment includes a first distributed key-value store with data, a second distributed key-value store stores copies of the data in the first distributed key-value store, and the data in the second distributed key-value store is the environment data from the data hub.

In block 1704, the issue resolution system 210 plays the simulated customer environment. In certain embodiments, the simulated customer environment is automatically played. In certain other embodiments, the simulated customer environment is played in response to receiving operations of: start, pause, continue, fast-forward, rewind, and position. In certain embodiments, playing the simulated customer environment includes: identifying a start time in a timeline of the simulated customer environment; identifying create, update, and delete operations from one or more audit logs after the start time; and applying the create, update, and delete operations to play the simulated customer environment.

In block 1706, in response to the playing, the issue resolution system 210 identifies one or more issues in the original customer environment using the simulated customer environment. In block 1708, the issue resolution system 210 identifies one or more solutions for the one or more issues. For example, the issue resolution system 210 may access a mapping of solutions to issues to identify a solution for a particular issue.

In block 1710, the issue resolution system 210 provides a recommendation with the solution of the one or more solutions for solving at least one of the one or more issues in the original customer environment. In block 1712, the issue resolution system 210 automatically initiates application of the recommendation to the original customer environment to resolve the at least one of the issues. Then, the API server 425 applies the recommendation to the customer environment.

In certain embodiments, the simulated customer environment may be changed, and the issue resolution system 210 automatically applies a recommended solution to the simulated customer environment and verifies (e.g., by running a workload again after application of the recommended solution) that the recommendation resolves the at least one of the issues.

In certain embodiments, the issue resolution system 210 retrieves a subset of the environment data based on a portion of a timeline of the simulated customer environment and generates another simulated customer environment using the subset of the data.

In certain embodiments, the one or more container orchestration clients consume the simulated customer environment.

In certain embodiments, the issue resolution system 210 provides an immutable, observable, and re-playable control plane of a container orchestration platform. The issue resolution system 210 records the environment data, by a container orchestration platform recorder 220, in different dimensions (i.e., records different types of data) of a container orchestration environment (e.g., resource metadata, status, events, workload logs, metrics, etc.) with correlation in place. That is, the different types of data are correlated with each other, e.g.: a workload creation event is one type of collected data, which has a reference to the workload resource that is another type of collected data, and the resource and the event are correlated via the workload identifier. The issue resolution system 210 generates a simulated customer environment 245 organized with one or more sessions, which follow the timeline of the original customer environment continuously, to build a holistic view of the original customer environment.

The issue resolution system 210 hosts the environment data recorded from the observed, original customer environment, in a data hub 230 as intermediate storage connected by the container orchestration platform recorder 220 either offline or online mode, then consumed by the container orchestration platform player 240 for the recreation of the observed, original customer environment.

The issue resolution system 210 reads and parses the environment data from the data hub 230, by the container orchestration platform player 240, organized with one or more sessions, to build an immutable control plane that supports a selected set of read operations.

In certain embodiments, the issue resolution system 210 records a set of scoped environment resources, by the container orchestration platform recorder 220, with an initial scan and a set of audit events in a specified scope as the change history of the original customer environment.

In certain embodiments, the issue resolution system 210 plays the changes selectively, by the container orchestration platform player 240, with the scoped environment resources loaded from the data hub 230, then applies changes by parsing the audit events through the timeline, to recreate the observed, original customer environment.

In certain embodiments, the issue resolution system 210 plays changes at any timestamp, by the container orchestration platform player 240. For example, the container orchestration platform player 240 may start playing the simulated customer environment 245 at the beginning of the timeline or in the middle of the timeline. As another example, the container orchestration platform player 240 may fast forward from an initial time to a specified time in the timeline and then move forward at a regular (slower) place. As a further example, the container orchestration platform player 240 allows rewinding the session any time to go to an early point in time of the timeline and replay.

The container orchestration platform player 240 allows starting, pausing, continuing, fast-forwarding, rewinding, or positioning one or more sessions of the simulated customer environment 245, at any time and for any number of times.

The issue resolution system 210 allows a user viewing the simulated customer environment 245 to gain a "time travel" experience consistently across container orchestration clients 260 that consume the simulated customer environment 245 because the control of the timeline is on the container orchestration platform player 240 side, not the third-party side.

The issue resolution system 210 simulates the original customer environment based on collected data (e.g., metrics, logs, events, etc.), which enables resolving customer issues by checking, searching, replaying, and executing commands interactively within the simulated customer environment. The issue resolution system 210 enables locating a problem in the original customer environment via further debug. The issue resolution system 210 records the state change of the original customer environment and plays back these state changes with the simulated customer environment 245.

In certain embodiments, the issue resolution system 210 captures historical data, including resource metadata, status, events, logs, etc. at runtime and builds the simulated customer environment 245.

In certain embodiments, the issue resolution system 210 enables the issue resolver 250 and developers to troubleshoot customer issues by replaying the original customer environment. For example, the issue resolution system 210 enables a container orchestration client 260 to get workloads, describe workloads, view workload logs, etc.

In certain embodiments, the observed scope of the simulated customer environment 245 may be modified by specifying a smaller time range, a specific namespace, etc. to simplify the problem domain with less noise, and explore a desired part of the recorded environment data.

With embodiments, the issue resolution system 210 speeds up the issue resolution lifecycle, saves operation costs, and increases customer satisfaction The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method, comprising operations for:
   storing environment data of an original customer environment in a data hub, wherein the original customer environment moves one or more workloads from a current state to a desired state, and wherein each of the one or more workloads comprises a container and data about the container;
   using the environment data from the data hub to create a simulated customer environment;
   playing the simulated customer environment;
   in response to the playing,
      identifying an issue of a workload of the one or more workloads in the original customer environment using the simulated customer environment; and
      identifying a solution for the issue;
   providing a recommendation with the solution for the issue in the original customer environment;
   automatically initiating application of the recommendation to the original customer environment to resolve the issue; and
   verifying that the application of the recommendation resolved the issue by running the workload.

2. The computer-implemented method of claim 1, further comprising operations for:
   recording the environment data of the original customer environment; and
   transporting the environment data to the data hub, wherein the environment data comprises metadata, status, events, workload logs, and metrics of one or more resources.

3. The computer-implemented method of claim 1, wherein the original customer environment of a customer cluster comprises a first distributed key-value store with data, wherein a player cluster comprises a second distributed key-value store that stores copies of the data in the first distributed key-value store, and wherein the data comprises the environment data from the data hub.

4. The computer-implemented method of claim 1, wherein the simulated customer environment is played in response to receiving operations comprising: start, pause, continue, fast-forward, rewind, and position.

5. The computer-implemented method of claim 1, wherein playing the simulated customer environment further comprises operations for:
   identifying a start time in a timeline of the simulated customer environment;
   identifying create, update, and delete operations from one or more audit logs after the start time; and
   applying the create, update, and delete operations to play the simulated customer environment.

6. The computer-implemented method of claim 1, further comprising operations for:
   retrieving a subset of the environment data based on a portion of a timeline of the simulated customer environment; and
   generating another simulated customer environment using the subset of the data that represents the portion of the timeline.

7. The computer-implemented method of claim 1, wherein one or more container orchestration clients consume the simulated customer environment, and wherein the one or more container orchestration clients perform cluster status manual exploration or cluster status auto-analysis.

8. A computer program product, the computer program product comprising a computer readable storage medium having program instructions embodied therewith, the program instructions executable by a processor to cause the processor to perform operations for:
   storing environment data of an original customer environment in a data hub, wherein the original customer environment moves one or more workloads from a current state to a desired state, and wherein each of the one or more workloads comprises a container and data about the container;
   using the environment data from the data hub to create a simulated customer environment;
   playing the simulated customer environment;
   in response to the playing,
      identifying an issue of a workload of the one or more workloads in the original customer environment using the simulated customer environment; and
      identifying a solution for the issue, wherein the solution comprises allocating storage to the workload;
   providing a recommendation with the solution for the issue in the original customer environment;
   automatically initiating application of the recommendation to the original customer environment to resolve the issue; and
   verifying that the application of the recommendation resolved the issue by running the workload.

9. The computer program product of claim 8, wherein the program instructions are executable by the processor to cause the processor to perform further operations for:
   recording the environment data of the original customer environment; and
   transporting the environment data to the data hub, wherein the environment data comprises metadata, status, events, workload logs, and metrics of one or more resources.

10. The computer program product of claim 8, wherein the original customer environment of a customer cluster comprises a first distributed key-value store with data, wherein a player cluster comprises a second distributed key-value store that stores copies of the data in the first distributed key-value store, and wherein the data comprises the environment data from the data hub.

11. The computer program product of claim 8, wherein the simulated customer environment is played in response to receiving operations comprising: start, pause, continue, fast-forward, rewind, and position.

12. The computer program product of claim 8, wherein, when playing the simulated customer environment, wherein the program instructions are executable by the processor to cause the processor to perform further operations for:
   identifying a start time in a timeline of the simulated customer environment;
   identifying create, update, and delete operations from one or more audit logs after the start time; and
   applying the create, update, and delete operations to play the simulated customer environment.

13. The computer program product of claim 8, wherein the program instructions are executable by the processor to cause the processor to perform further operations for:
    retrieving a subset of the environment data based on a portion of a timeline of the simulated customer environment; and
    generating another simulated customer environment using the subset of the data that represents the portion of the timeline.

14. The computer program product of claim 8, wherein one or more container orchestration clients consume the simulated customer environment, and wherein the one or more container orchestration clients perform cluster status manual exploration or cluster status auto-analysis.

15. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    storing environment data of an original customer environment in a data hub, wherein the original customer environment moves one or more workloads from a current state to a desired state, and wherein each of the one or more workloads comprises a container and data about the container;
    using the environment data from the data hub to create a simulated customer environment;
    playing the simulated customer environment;
    in response to the playing,
        identifying an issue of a workload of the one or more workloads in the original customer environment using the simulated customer environment; and
        identifying a solution for the issue, wherein the solution comprises allocating storage to the workload;
    providing a recommendation with the solution for the issue in the original customer environment;
    automatically initiating application of the recommendation to the original customer environment to resolve the issue; and
    verifying that the application of the recommendation resolved the issue by running the workload.

16. The computer system of claim 15, wherein the program instructions perform further operations comprising:
    recording the environment data of the original customer environment; and
    transporting the environment data to the data hub, wherein the environment data comprises metadata, status, events, workload logs, and metrics of one or more resources.

17. The computer system of claim 15, wherein the original customer environment of a customer cluster comprises a first distributed key-value store with data, wherein a player cluster comprises a second distributed key-value store that stores copies of the data in the first distributed key-value store, and wherein the data comprises the environment data from the data hub.

18. The computer system of claim 15, wherein the simulated customer environment is played in response to receiving operations comprising: start, pause, continue, fast-forward, rewind, and position.

19. The computer system of claim 15, wherein, when playing the simulated customer environment, the program instructions perform further operations comprising:
    identifying a start time in a timeline of the simulated customer environment;
    identifying create, update, and delete operations from one or more audit logs after the start time; and
    applying the create, update, and delete operations to play the simulated customer environment.

20. The computer system of claim 15, wherein the program instructions perform further operations comprising:
    retrieving a subset of the environment data based on a portion of a timeline of the simulated customer environment; and
    generating another simulated customer environment using the subset of the data that represents the portion of the timeline.

* * * * *